United States Patent
Moguillansky et al.

(10) Patent No.: US 12,118,757 B2
(45) Date of Patent: Oct. 15, 2024

(54) SIGNALING CAMERA PARAMETERS IN POINT CLOUD CODING

(71) Applicant: Huawei Technologies Co., Ltd., Guangdong (CN)

(72) Inventors: Jeffrey Moguillansky, Addison, TX (US); Vladyslav Zakharchenko, Sunnyvale, CA (US); Jianle Chen, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 51 days.

(21) Appl. No.: 17/857,894

(22) Filed: Jul. 5, 2022

(65) Prior Publication Data

US 2022/0343547 A1    Oct. 27, 2022

Related U.S. Application Data

(63) Continuation of application No. PCT/US2021/012319, filed on Jan. 6, 2021.

(60) Provisional application No. 62/957,674, filed on Jan. 6, 2020.

(51) Int. Cl.
*H04N 19/70* (2014.01)
*G06T 9/00* (2006.01)

(52) U.S. Cl.
CPC .............. *G06T 9/00* (2013.01); *H04N 19/70* (2014.11)

(58) Field of Classification Search
CPC .................................. G06T 9/00; H04N 19/70
USPC .................................................... 375/240.26
See application file for complete search history.

(56) References Cited

U.S. PATENT DOCUMENTS

| 2013/0249901 A1* | 9/2013 | Sweet ..................... G06T 15/04 345/419 |
| 2014/0300637 A1 | 10/2014 | Fan et al. |
| 2019/0197739 A1 | 6/2019 | Sinharoy et al. |
| 2019/0313110 A1* | 10/2019 | Mammou ............... G06T 7/248 |
| 2020/0014940 A1 | 1/2020 | Dawar et al. |
| 2020/0389669 A1 | 12/2020 | Lucas |
| 2022/0159298 A1 | 5/2022 | Boyce |

FOREIGN PATENT DOCUMENTS

| EP | 3349182 A1 | 7/2018 |
| EP | 4124032 A1 | 1/2023 |
| JP | 2020515937 A | 5/2020 |

(Continued)

OTHER PUBLICATIONS

"Series H: Audiovisual and Multimedia Systems; Infrastructure of audiovisual services—Coding of moving video; Advanced video coding for generic audiovisual services," Recommendation ITU-T H.264, Jun. 2019, 836 pages.

(Continued)

*Primary Examiner* — Amir Shahnami
(74) *Attorney, Agent, or Firm* — Conley Rose, P.C.

(57) ABSTRACT

A video coding mechanism is disclosed. The mechanism includes receiving a bitstream comprising a plurality of two dimensional (2D) patches in an atlas frame and a camera offset for a camera. The patches are decoded and converted to a three dimensional (3D) patch coordinate system to obtain a point cloud frame. An offset matrix is determined based on the camera offset. The offset is then applied matrix to the point cloud frame.

14 Claims, 12 Drawing Sheets

(56) References Cited

FOREIGN PATENT DOCUMENTS

JP          2022532302 A    7/2022
WO          2018130491 A1   7/2018

OTHER PUBLICATIONS

"Series H: Audiovisual and Multimedia Systems; Infrastructure of audiovisual services—Coding of moving video; High efficiency video coding" Recommendation ITU-T H.265, Apr. 2013, 317 pages.
"Call for Proposals for Point Cloud Compression V2," International Organization for Standardization Organisation Internationale de Normalisation ISO/IEC JTC1/SC29/WG11 Coding of Moving Pictures and Audio; MPEG2017/N16763, Hobart, AU, Apr. 2017, 21 pages.
"PCC Test Model Category 2 v1," International Organisation for Standardisation Organisation Internationale de Normalisation ISO/IEC JTC1/SC29/WG11 Coding of Moving Pictures and Audio, N17348, Gwangju, Republic of Korea, Jan. 2018, 11 pages.
"First Working Draft for PCC Category 2," International Organization for Standardization Organisation Internationale De Normalisation ISO/IEC JTC 1/SC 29/WG 11 Coding of Moving Pictures and Audio, MPEG 2012/N17374, Gwangju, Korea, Jan. 2018, 5 pages.
Wikipedia, "Rotation Matrix," Jul. 10, 2018, XP055798131, 24 pages.

* cited by examiner

SIGNALING CAMERA PARAMETERS IN POINT CLOUD CODING

CROSS-REFERENCE TO RELATED APPLICATIONS

This patent application is a continuation of International Application No. PCT/US2021/012319, filed Jan. 6, 2021 by Jeffrey Moguillansky, et. al., and titled "Signaling Camera Parameters In Point Cloud Coding," which claims the benefit of U.S. Provisional Patent Application No. 62/957,674, filed Jan. 6, 2020 by Jeffrey Moguillansky, et al., and titled "Signaling Camera Parameters In Point Cloud Coding," which is hereby incorporated by reference in its entirety.

TECHNICAL FIELD

The present disclosure is generally related to video coding, and is specifically related to improvements to support signaling default viewing positions and angles for Video Point Cloud Coding (V-PCC).

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method implemented by a decoder, the method comprising: receiving, by a receiver of the decoder, a bitstream comprising a plurality of patches in an atlas frame and a camera offset for a camera; decoding, by a processor of the decoder, the patches from the atlas frame; converting, by the processor, the patches to a three dimensional (3D) patch coordinate system to obtain point cloud content; determining, by the processor, an offset matrix based on the camera offset; and applying, by the processor, the offset matrix to the point cloud content.

Point cloud coding (PCC) systems decode PCC components to reconstruct a 3D point cloud. Some PCC systems then position a camera at a default position that is predefined at a decoder. The camera is used to render the 3D point cloud as a two dimensional (2D) image that can be displayed on a flat screen. The camera position defines the portion of the 3D point cloud depicted to the user at a corresponding instant. Such systems may require a user to take control of the camera and move the camera to a preferred position to render the desired content from a preferred angle. This may be problematic for some applications as the user may be unaware of a best position from which to view the desired content. For example, a user may watch a PCC video of a football game. The default camera position may be near the center of the football field. The user may wish to view the PCC video from a position near a quarterback or striker, but may not know where the quarterback or striker is located on the field. This results in time consuming searching, which may create an undesirable user experience.

The present example includes mechanisms to signal preferred viewing positions and angles. For example, a content creator may select one or more viewing positions and/or viewing angles at the time of encoding. The user can then select the preferred viewing position(s) when viewing the PCC video. In order to accomplish this result, the encoder can encode one or more camera offsets for determining camera position and corresponding camera rotations for determining camera viewing angles. A camera offset (e.g., camera position) includes an X, Y, Z offset from a predefined point of a bounding box containing the PCC content. A camera rotation includes a viewing vector describing the direction the camera is pointing (e.g., viewing angle) from the position described by the camera offset. The decoder can read the camera offset and camera rotation and then render the PCC video accordingly. For example, the PCC video can be positioned in a model matrix during decoding. The camera information can be applied to the model matrix as a transform into order to render a 2D image from the 3D point cloud. For example, the camera offset can be used to create an offset matrix and the camera rotation can be used to create a rotation matrix. The offset matrix and the rotation matrix can then be applied to the model matrix to transform PCC content into a 2D image that displays the point cloud from the predetermined position and angle. Hence, the present example increases functionality at both an encoder and decoder by creating predetermined and selectable viewing positions and angles for PCC video content. Further, the present disclosure supports mechanisms to increase coding efficiency, and hence supports a reduction in processor, memory, and/or network resource usage at an encoder and/or a decoder.

Optionally, in any of the preceding aspects, another implementation of the aspect provides, wherein the camera offset indicates a first offset corresponding to an X axis, a second offset corresponding to a Y axis, and a third offset corresponding to a Z axis.

Optionally, in any of the preceding aspects, another implementation of the aspect provides, wherein the offset matrix comprises four rows and four columns, wherein the first offset is positioned at row one column four, wherein the second offset is positioned at row two column four, and wherein the third offset is positioned at row three column four.

Optionally, in any of the preceding aspects, another implementation of the aspect provides, wherein the bitstream further comprises a camera rotation for the camera, and wherein the method further comprises: determining, by the processor, a rotation matrix based on the camera rotation; and applying, by the processor, the rotation matrix to the point cloud content.

Optionally, in any of the preceding aspects, another implementation of the aspect provides, wherein the camera rotation specifies an X component for a rotation of the camera using quaternion representation, a Y component for the rotation of the camera using quaternion representation, and a Z component for the rotation of the camera using quaternion representation.

Optionally, in any of the preceding aspects, another implementation of the aspect provides, wherein the rotation matrix includes the X component, the Y component, the Z component, and a W component for the rotation of the camera using quaternion representation.

Optionally, in any of the preceding aspects, another implementation of the aspect provides, wherein the W component is calculated according to: qW=Sqrt(1−qX2+qY2+qZ2)), where qW, qX, qY, and qZ represents the W component, the X component, the Y component, and the Z component, respectively, and where Sqrt is a square root function.

Optionally, in any of the preceding aspects, another implementation of the aspect provides, wherein the patches in the atlas frame are 2D patches.

In an embodiment, the disclosure includes a method implemented by an encoder, the method comprising: encoding, by a processor, a plurality of 2D patches and a geometry describing a point cloud frame into a point cloud coding (PCC) bitstream; determining, by the processor, a camera offset describing a position of a camera relative to the point cloud frame to support generation of an offset matrix for rendering a camera view of the point cloud frame; encoding, by the processor, the camera offset into the PCC bitstream; and storing, by a memory of the encoder, the PCC bitstream for communication toward a decoder.

PCC systems decode PCC components to reconstruct a 3D point cloud. Some PCC systems then position a camera at a default position that is predefined at a decoder. The camera is used to render the 3D point cloud as a 2D image that can be displayed on a flat screen. The camera position defines the portion of the 3D point cloud depicted to the user at a corresponding instant. Such systems may require a user to take control of the camera and move the camera to a preferred position to render the desired content from a preferred angle. This may be problematic for some applications as the user may be unaware of a best position from which to view the desired content. For example, a user may watch a PCC video of a football game. The default camera position may be near the center of the football field. The user may wish to view the PCC video from a position near a quarterback or striker, but may not know where the quarterback or striker is located on the field. This results in time consuming searching, which may create an undesirable user experience.

The present example includes mechanisms to signal preferred viewing positions and angles. For example, a content creator may select one or more viewing positions and/or viewing angles at the time of encoding. The user can then select the preferred viewing position(s) when viewing the PCC video. In order to accomplish this result, the encoder can encode one or more camera offsets for determining camera position and corresponding camera rotations for determining camera viewing angles. A camera offset (e.g., camera position) includes an X, Y, Z offset from a predefined point of a bounding box containing the PCC content. A camera rotation includes a viewing vector describing the direction the camera is pointing (e.g., viewing angle) from the position described by the camera offset. The decoder can read the camera offset and camera rotation and then render the PCC video accordingly. For example, the PCC video can be positioned in a model matrix during decoding. The camera information can be applied to the model matrix as a transform into order to render a 2D image from the 3D point cloud. For example, the camera offset can be used to create an offset matrix and the camera rotation can be used to create a rotation matrix. The offset matrix and the rotation matrix can then be applied to the model matrix to transform PCC content into a 2D image that displays the point cloud from the predetermined position and angle. Hence, the present example increases functionality at both an encoder and decoder by creating predetermined and selectable viewing positions and angles for PCC video content. Further, the present disclosure supports mechanisms to increase coding efficiency, and hence supports a reduction in processor, memory, and/or network resource usage at an encoder and/or a decoder.

Optionally, in any of the preceding aspects, another implementation of the aspect provides, wherein the camera offset indicates a first offset corresponding to an X axis, a second offset corresponding to a Y axis, and a third offset corresponding to a Z axis.

Optionally, in any of the preceding aspects, another implementation of the aspect provides, wherein the offset matrix comprises four rows and four columns, wherein the first offset is positioned at row one column four, wherein the second offset is positioned at row two column four, and wherein the third offset is positioned at row three column four.

Optionally, in any of the preceding aspects, another implementation of the aspect provides, further comprising: determining, by the processor, a camera rotation describing a viewing vector for the camera relative to the point cloud frame to support generation of a rotation matrix for rendering the camera view of the point cloud frame; and encoding, by the processor, the camera rotation into the PCC bitstream.

Optionally, in any of the preceding aspects, another implementation of the aspect provides, wherein the camera rotation specifies an X component for a rotation of the camera using quaternion representation, a Y component for the rotation of the camera using quaternion representation, and a Z component for the rotation of the camera using quaternion representation.

Optionally, in any of the preceding aspects, another implementation of the aspect provides, wherein the rotation matrix includes the X component, the Y component, the Z component, and a W component for the rotation of the camera using quaternion representation.

Optionally, in any of the preceding aspects, another implementation of the aspect provides, wherein the W component is calculated according to: qW=Sqrt(1−qX2+qY2+qZ2)), where qW, qX, qY, and qZ represents the W component, the X component, the Y component, and the Z component, respectively, and where Sqrt is a square root function.

In an embodiment, the disclosure includes a video coding device comprising: a processor, a receiver coupled to the processor, a memory coupled to the processor, and a transmitter coupled to the processor, wherein the processor, receiver, memory, and transmitter are configured to perform the method of any of the preceding aspects.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

In an embodiment, the disclosure includes a decoder comprising: a receiving means for receiving a bitstream comprising a plurality of patches in an atlas frame and a camera offset for a camera; a decoding means for decoding the patches; a converting means for converting the patches to a 3D patch coordinate system to obtain a point cloud frame; a determining means for determining an offset matrix based on the camera offset; and an applying means for applying the offset matrix to the point cloud frame.

PCC systems decode PCC components to reconstruct a 3D point cloud. Some PCC systems then position a camera at a default position that is predefined at a decoder. The camera is used to render the 3D point cloud as a 2D image that can be displayed on a flat screen. The camera position defines the portion of the 3D point cloud depicted to the user at a corresponding instant. Such systems may require a user to take control of the camera and move the camera to a preferred position to render the desired content from a preferred angle. This may be problematic for some applications as the user may be unaware of a best position from which to view the desired content. For example, a user may watch a PCC video of a football game. The default camera position may be near the center of the football field. The user may wish to view the PCC video from a position near a quarterback or striker, but may not know where the quarterback or striker is located on the field. This results in time consuming searching, which may create an undesirable user experience.

The present example includes mechanisms to signal preferred viewing positions and angles. For example, a content creator may select one or more viewing positions and/or viewing angles at the time of encoding. The user can then select the preferred viewing position(s) when viewing the PCC video. In order to accomplish this result, the encoder can encode one or more camera offsets for determining camera position and corresponding camera rotations for determining camera viewing angles. A camera offset (e.g., camera position) includes an X, Y, Z offset from a predefined point of a bounding box containing the PCC content. A camera rotation includes a viewing vector describing the direction the camera is pointing (e.g., viewing angle) from the position described by the camera offset. The decoder can read the camera offset and camera rotation and then render the PCC video accordingly. For example, the PCC video can be positioned in a model matrix during decoding. The camera information can be applied to the model matrix as a transform in order to render a 2D image from the 3D point cloud. For example, the camera offset can be used to create an offset matrix and the camera rotation can be used to create a rotation matrix. The offset matrix and the rotation matrix can then be applied to the model matrix to transform PCC content into a 2D image that displays the point cloud from the predetermined position and angle. Hence, the present example increases functionality at both an encoder and decoder by creating predetermined and selectable viewing positions and angles for PCC video content. Further, the present disclosure supports mechanisms to increase coding efficiency, and hence supports a reduction in processor, memory, and/or network resource usage at an encoder and/or a decoder.

Optionally, in any of the preceding aspects, another implementation of the aspect provides, wherein the decoder is further configured to perform the method of any of the preceding aspects.

In an embodiment, the disclosure includes an encoder comprising: a determining means for determining a camera offset describing a position of a camera relative to a point cloud frame to support generation of an offset matrix for rendering a camera view of the point cloud frame; an encoding means for: encoding a plurality of 2D patches and a geometry describing a point cloud frame into a PCC bitstream; and encoding the camera offset into the PCC bitstream; and a storing means for storing the bitstream for communication toward a decoder.

PCC systems decode PCC components to reconstruct a 3D point cloud. Some PCC systems then position a camera at a default position that is predefined at a decoder. The camera is used to render the 3D point cloud as a 2D image that can be displayed on a flat screen. The camera position defines the portion of the 3D point cloud depicted to the user at a corresponding instant. Such systems may require a user to take control of the camera and move the camera to a preferred position to render the desired content from a preferred angle. This may be problematic for some applications as the user may be unaware of a best position from which to view the desired content. For example, a user may watch a PCC video of a football game. The default camera position may be near the center of the football field. The user may wish to view the PCC video from a position near a quarterback or striker, but may not know where the quarterback or striker is located on the field. This results in time consuming searching, which may create an undesirable user experience.

The present example includes mechanisms to signal preferred viewing positions and angles. For example, a content creator may select one or more viewing positions and/or viewing angles at the time of encoding. The user can then select the preferred viewing position(s) when viewing the PCC video. In order to accomplish this result, the encoder can encode one or more camera offsets for determining camera position and corresponding camera rotations for determining camera viewing angles. A camera offset (e.g., camera position) includes an X, Y, Z offset from a predefined point of a bounding box containing the PCC content. A camera rotation includes a viewing vector describing the direction the camera is pointing (e.g., viewing angle) from the position described by the camera offset. The decoder can read the camera offset and camera rotation and then render the PCC video accordingly. For example, the PCC video can be positioned in a model matrix during decoding. The camera information can be applied to the model matrix as a transform in order to render a 2D image from the 3D point cloud. For example, the camera offset can be used to create an offset matrix and the camera rotation can be used to create a rotation matrix. The offset matrix and the rotation matrix can then be applied to the model matrix to transform PCC content into a 2D image that displays the point cloud from the predetermined position and angle. Hence, the present example increases functionality at both an encoder and decoder by creating predetermined and selectable viewing positions and angles for PCC video content. Further, the present disclosure supports mechanisms to increase coding efficiency, and hence supports a reduction in processor, memory, and/or network resource usage at an encoder and/or a decoder.

Optionally, in any of the preceding aspects, another implementation of the aspect provides, wherein the encoder is further configured to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
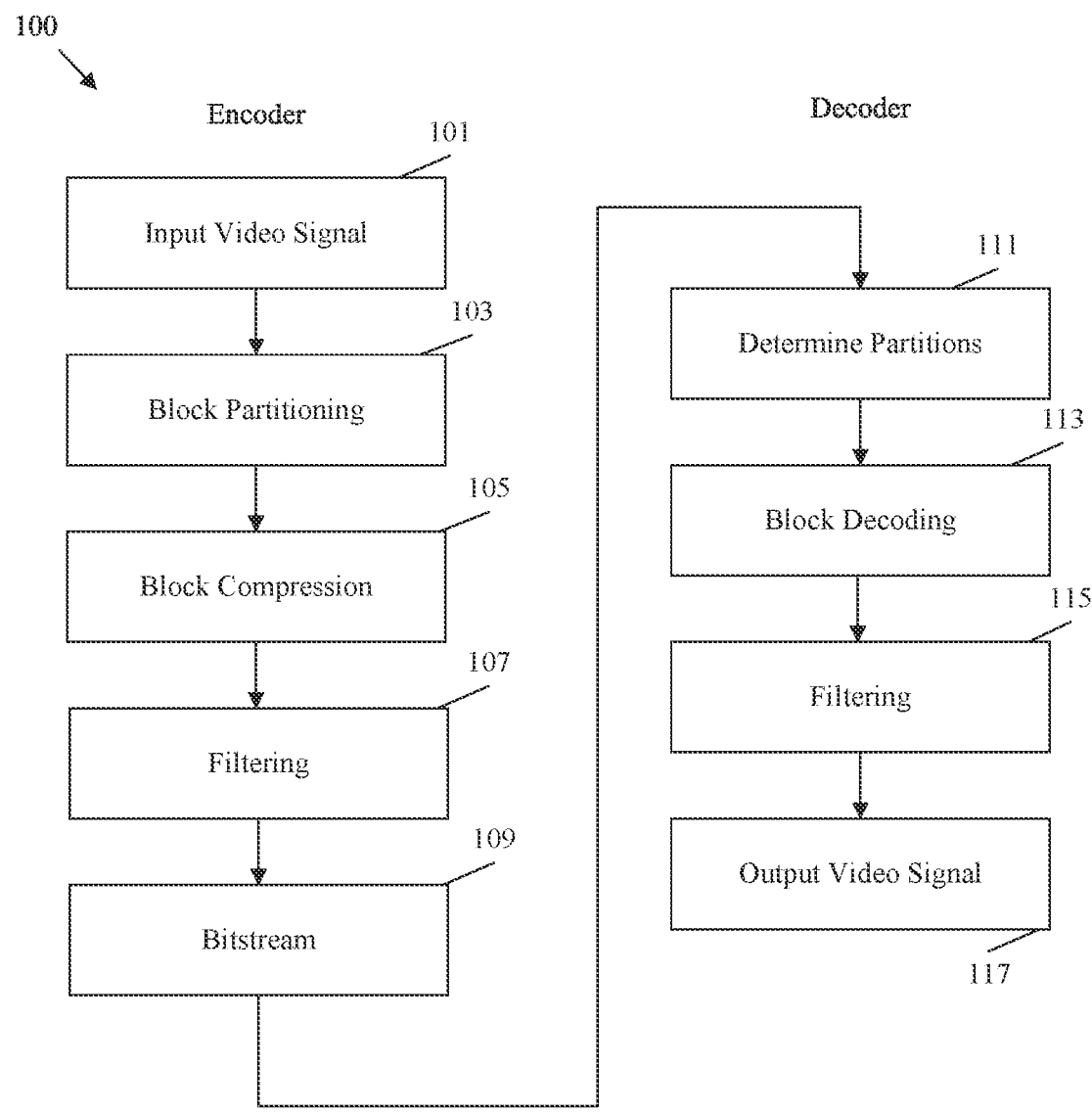
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following terms are defined as follows unless used in a contrary context herein. Specifically, the following definitions are intended to provide additional clarity to the present disclosure. However, terms may be described differently in different contexts. Accordingly, the following definitions should be considered as a supplement and should not be considered to limit any other definitions of descriptions provided for such terms herein.

An encoder is a device that is configured to employ encoding processes to compress video data into a bitstream. A decoder is a device that is configured to employ decoding processes to reconstruct video data from a bitstream for display. A point cloud/point cloud representation is a group of points (e.g., samples) in three-dimensional (3D) space, where each point may contain a position, a color, and/or attribute(s). A bitstream is a sequence of bits including video data that is compressed for transmission between an encoder and a decoder. In a PCC context, a bitstream includes a sequence of bits of coded V-PCC components and associated parameters.

A V-PCC component (or more generally a PCC component) may be atlas data, occupancy data, geometry data, or attribute data of a particular type that is associated with a V-PCC point cloud. An atlas/atlas frame may be a collection of two-dimensional (2D) bounding boxes (also known as patches) projected into rectangular frames that correspond to a volume in 3D space, known as a 3D bounding box, upon which volumetric data is rendered. Each 2D bounding box/patch represents a subset of a point cloud. A patch is a 2D rectangular region within an atlas associated with volumetric information. Projection is the presentation of an image (e.g., a patch) onto a surface. A 3D bounding box is a volume defined as a cuboid solid having six rectangular faces placed at right angles. An occupancy is a set of values that indicate whether atlas samples correspond to associated samples in 3D space. An occupancy frame may be a collection of occupancy values that constitute a 2D array and represents the entire occupancy information for a single atlas frame. Accordingly, an occupancy frame may indicate, for each sample position in the atlas, whether that position corresponds to a valid 3D point in the point cloud representation. A geometry is a set of cartesian coordinates associated with a volumetric frame. A geometry map is a frame containing geometry patch information projected at a particular depth. An attribute may be a scalar or vector property optionally associated with each point in a volumetric frame of a point cloud such as color, reflectance, surface normal, time stamps, material identifier (ID), etc. A volumetric frame, also known as a point cloud frame, is set of 3D points specified by cartesian coordinates and zero or more corresponding sets of attributes at a particular time instance. Point cloud content is any data contained in a point cloud frame. A complete set of atlas data, occupancy data, geometry maps, or attributes associated with a particular time instance/volumetric frame may be referred to as an atlas frame, an occupancy frame, a geometry frame, and an attribute frame, respectively. Atlas data, occupancy data, geometry data, or attribute data may be components of a point cloud, and hence may be referred to as atlas components, occupancy components, geometry components, and attribute frame components, respectively.

A camera is a viewport that provides a 2D view of a 3D object. A camera object can be employed to render a 2D representation of a 3D point cloud at a corresponding instant. A camera and/or camera object can be implemented as a camera model, which is one or more matrices including camera position and/or camera rotation. A coordinate system is a mechanism of using a plurality of numerical designations to uniquely determine positions of points in a space. A 3D coordinate system is a coordinate system that describes positions in a 3D space. A camera offset is a parameter that indicates distance in 3D space between a camera position and a predefined point of a 3D bounding box containing a point cloud. An offset matrix is a matrix representation of a camera offset that can be applied to transform a 3D model of points in a model matrix into a 2D representation. A matrix column is a group of numbers extending vertically from a top of a matrix to a bottom of the matrix. A matrix row is a group of numbers extending horizontally from a left side of a matrix to a right side of the matrix. A camera rotation is a parameter that indicates a viewing vector pointing from a camera to a 3D bounding box containing a point cloud. A rotation matrix is a matrix representation of a camera rotation that can be applied to transform a 3D model of points in a model matrix into a 2D representation. A quaternion representation is a representation of a vector in a complex number domain using a scalar value and three unit vectors along spatial axes.

V-PCC is a mechanism for efficiently coding three dimensional (3D) objects represented by a 3D cloud of points of varying color. V-PCC is a type of PCC, and hence such terms may be used interchangeably in most contexts. A point cloud is captured over time and included in PCC components. The PCC components are then encoded. The position of each valid point in the cloud at a time instance is stored as a geometry map in a geometry frame. The colors and luminance are stored as patches. Specifically, the patches at an instant in time are packed into an atlas frame. The patches generally do not cover the entire atlas frame. Accordingly, occupancy frames are also generated that indicate which portions of the atlas frame contain patch data. Optionally, attributes of the points, such as transparency, may be included in an attribute frame. As such, each PCC frame can be encoded as a plurality of frames containing different components describing the point cloud at a corresponding instant.

PCC systems decode PCC components to reconstruct a 3D point cloud. Some PCC systems then position a camera at a default position that is predefined at a decoder. The camera is used to render the 3D point cloud as a two dimensional (2D) image that can be displayed on a flat screen. The camera position defines the portion of the 3D point cloud depicted to the user at a corresponding instant. Such systems may require a user to take control of the camera and move the camera to a preferred position to render the desired content from a preferred angle. This may be problematic for some applications as the user may be unaware of a best position from which to view the desired content. For example, a user may watch a PCC video of a football game. The default camera position may be near the center of the football field. The user may wish to view the PCC video from a position near a quarterback or striker, but may not know where the quarterback or striker is located on the field. This results in time consuming searching, which may create an undesirable user experience.

Disclosed herein are mechanisms to signal preferred viewing positions and angles. For example, a content creator may select one or more viewing positions and/or viewing angles at the time of encoding. The user can then select the preferred viewing position(s) when viewing the PCC video. In order to accomplish this result, the encoder can encode one or more camera offsets for determining camera position and corresponding camera rotations for determining camera viewing angles. A camera offset (e.g., camera position) includes an X, Y, Z offset from a predefined point of a bounding box containing the PCC content. A camera rotation includes a viewing vector describing the direction the camera is pointing (e.g., viewing angle) from the position described by the camera offset. The decoder can read the camera offset and camera rotation and then render the PCC video accordingly. For example, the PCC video can be positioned in a model matrix during decoding. The camera information can be applied to the model matrix as a transform into order to render a 2D image from the 3D point cloud. For example, the camera offset can be used to create an offset matrix and the camera rotation can be used to create a rotation matrix. The offset matrix and the rotation matrix can then be applied to the model matrix to transform PCC content into a 2D image that displays the point cloud from the predetermined position and angle. Hence, the present example increases functionality at both an encoder and decoder by creating predetermined and selectable viewing positions and angles for PCC video content. Further, the present disclosure supports mechanisms to increase coding efficiency, and hence supports a reduction in processor, memory, and/or network resource usage at an encoder and/or a decoder.

Figure 5:
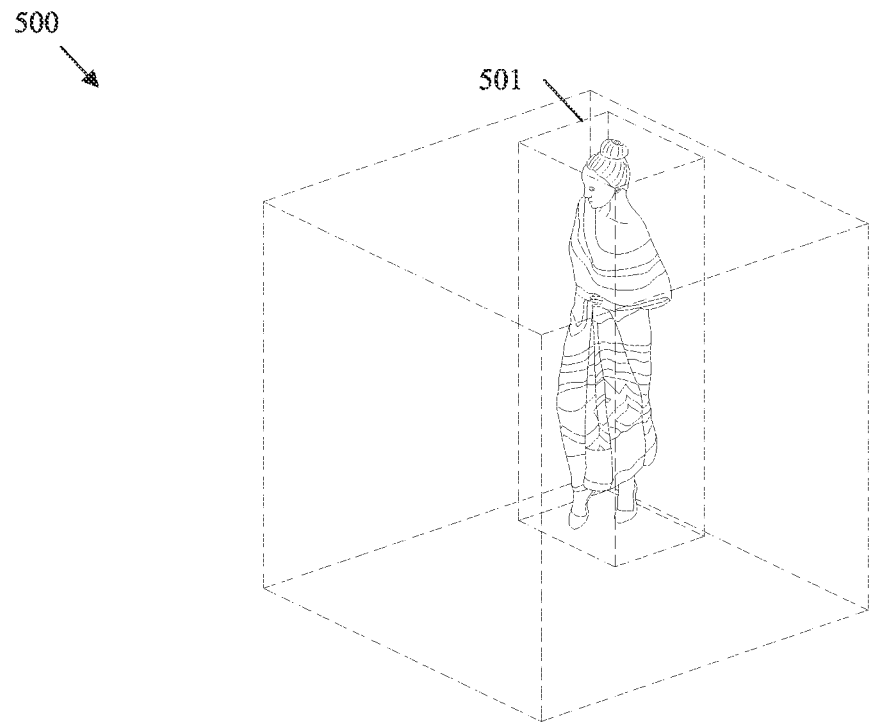
FIG. 5 is an example of point cloud media that can be coded according to Point Cloud Compression (PCC) mechanisms.
Figure 6:
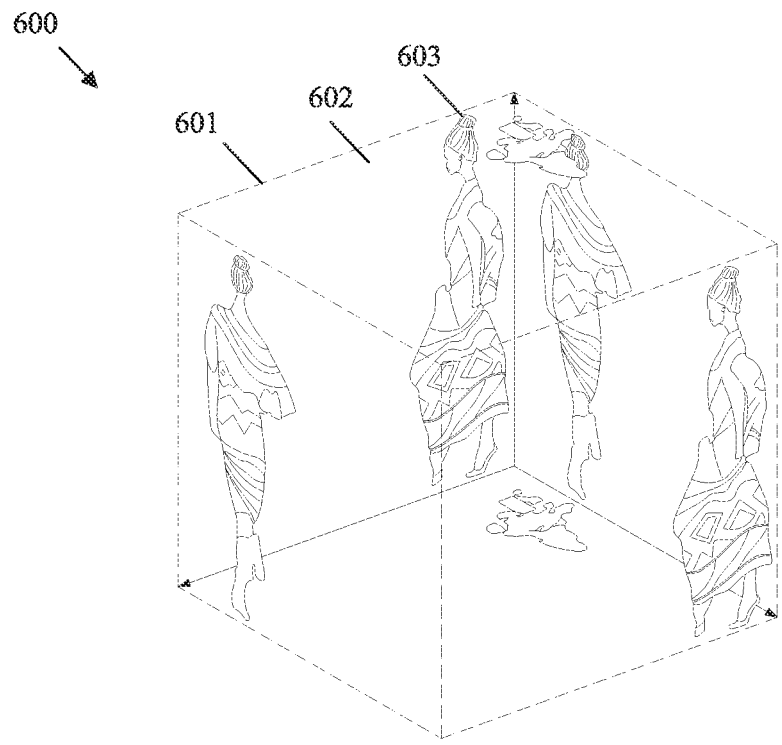
FIG. 6 is an example of patches created from a point cloud.

FIGS. 1-4 describe various coding mechanisms used to encode and decode a video. FIGS. 5-7 describe mechanisms used to covert a point cloud into a format that can be encoded and decoded by the mechanisms described in FIGS. 1-4.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three-dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artifacts. Once the frames are filtered, the video signal can be output to a display at step 117 for viewing by an end user.

Figure 2:
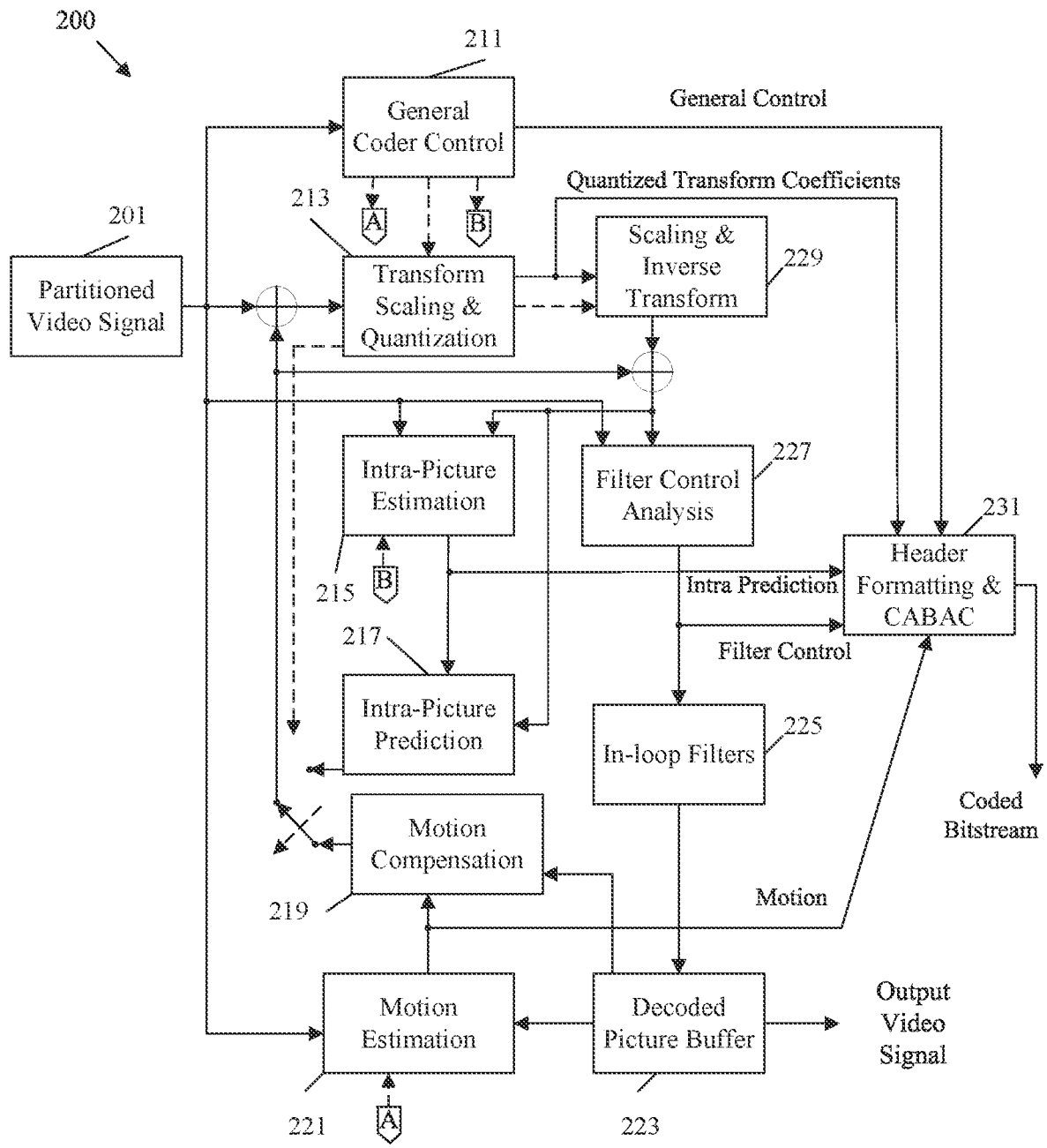
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder, codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
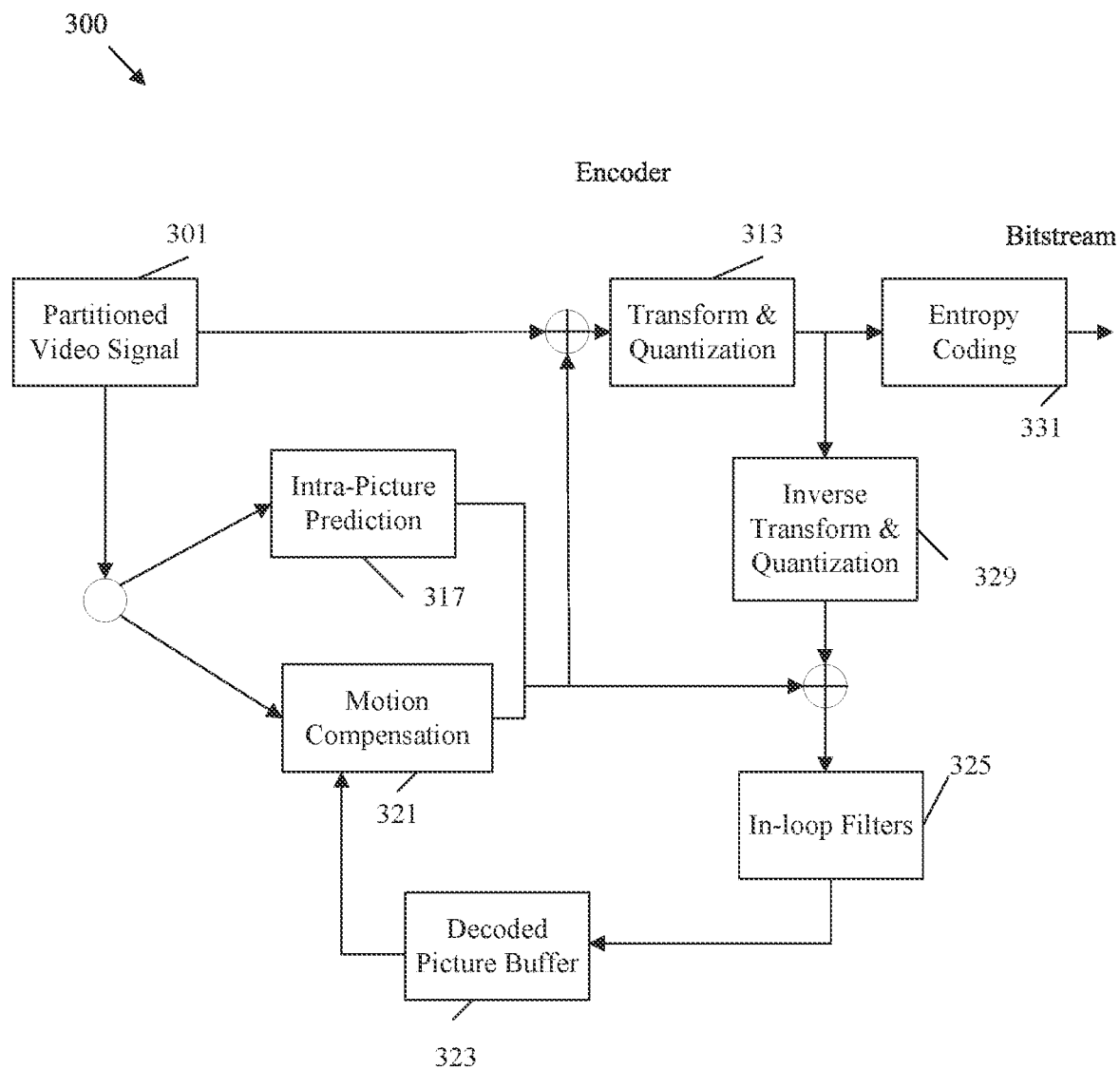
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream.

The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
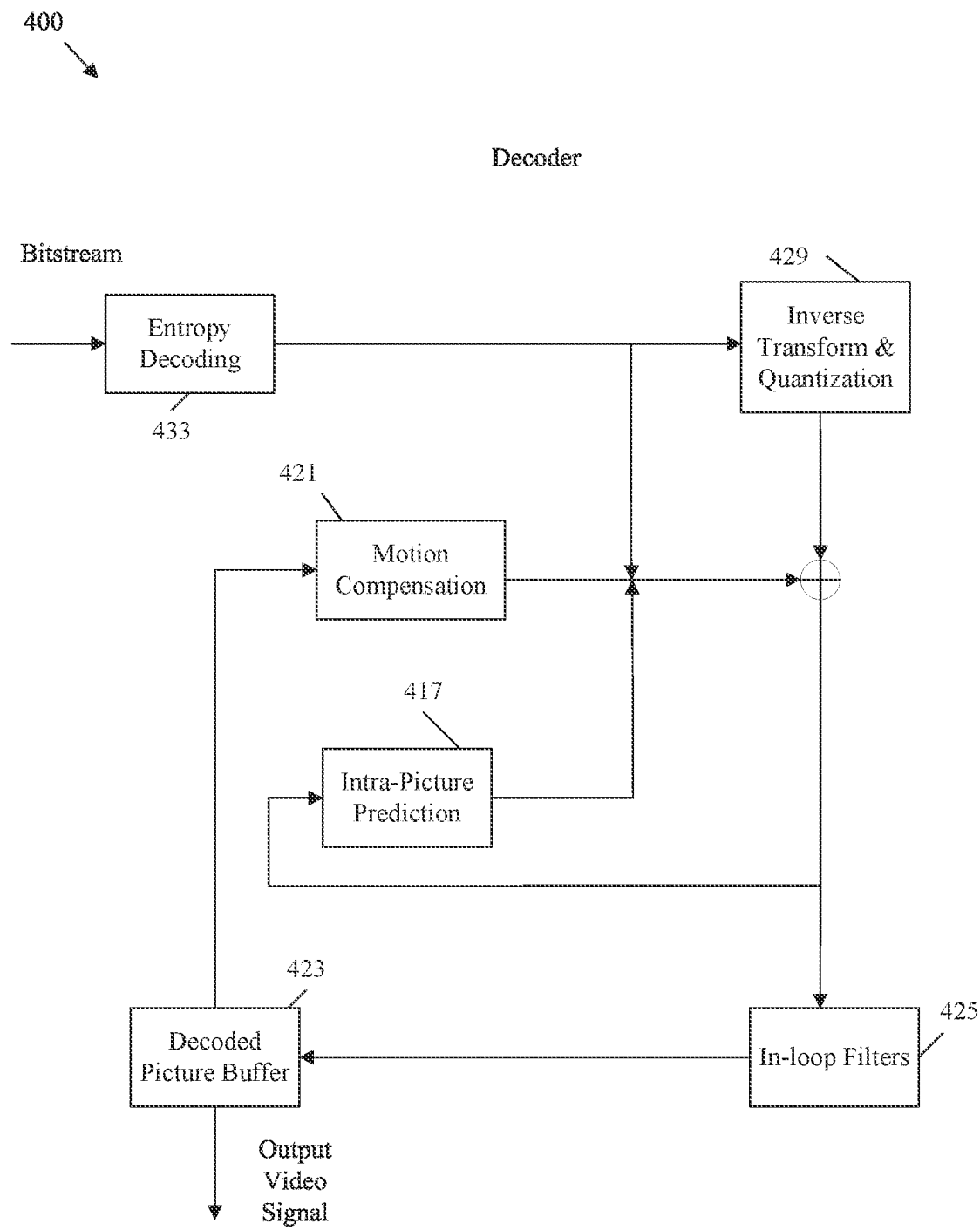
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

The preceding mechanisms are example machines and/or processes that can be employed to encode and decode 2D video presented in square/rectangular frames. However, PCC video data uses points to represent an irregular 3D object. The following mechanisms are PCC specific video coding processes. These mechanisms can be employed to represent a 3D point cloud in 2D square/rectangular frames so that the 2D frames can be encoded/decoded by the preceding mechanisms. As a general example, the 3D point cloud at a particular instant in time can be described by a geometry frame that indicates the position of each point. The color values and light values of the points can be represented as 2D patches that are projected onto the points as indicated by the geometry frame. The patches for an instant in time are packed into a square/rectangular atlas frame, which can be encoded/decoded by the mechanism described above. As the patches may not completely cover the atlas frame, a corresponding occupancy frame can be employed to indicate which areas of the atlas frame contain patch data and which areas are empty of usable video data. Any additional attributes for the points can be coded in corresponding attribute frames. The following describes these mechanisms in more detail.

FIG. 5 is an example of point cloud media 500 that can be coded according to PCC mechanisms. Accordingly, point cloud media 500 may be coded by an encoder, such as codec system 200 and/or encoder 300, and reconstructed by a decoder, such as codec system 200 and/or decoder 400, when performing method 100.

The mechanisms described in FIGS. 1-4 generally presume a 2D frame is being coded. However, point cloud media 500 is a cloud of points that change over time. Specifically, the point cloud media 500, which can also be referred to as a point cloud and/or a point cloud representation, is group of points in 3D space. The points may also be referred to as samples. Each point may be associated with multiple types of data. For example, each point may be described in terms of position. Position is a location in 3D space that may be described as a set of Cartesian coordinates. Further, each point may contain a color. Color may be described in terms of luminance (e.g., light) and chrominance (e.g., color). Color may be described in terms of (R), green (G), and blue (B) values, or luma (Y), blue projection (U), and red projection (V), denoted as (R, G, B) or (Y, U, V), respectively. The points may also include other attributes. An attribute is an optional scalar or a vector property that may be associated with each point in a point cloud. Attributes may include reflectance, transparency, surface normal, time stamps, material identifier (ID), etc.

As each point in a point cloud media 500 may be associated with multiple types of data, several supporting mechanisms are employed to prepare the point cloud media 500 for compression according to the mechanisms described in FIGS. 1-4. For example, the point cloud media 500 can be sorted into frames, where each frame includes all the data related to a point cloud for a particular state or instant in time. As such, FIG. 5 depicts a single frame of the point cloud media 500. The point cloud media 500 is then coded on a frame by frame basis. The point cloud media 500 can be surrounded by a 3D bounding box 501. The 3D bounding box 501 is a 3D rectangular prism that is sized to surround all of the points of the point cloud media 500 for the corresponding frame. The 3D bounding box 501 may be formally defined as a volume defined as a cuboid solid having six rectangular faces placed at right angles. It should be noted that multiple 3D bounding boxes 501 may be employed in the event that the point cloud media 500 includes disjoint sets. For example, the point cloud media 500 could depict two figures that are not connected, in which case a 3D bounding box 501 would be placed around each figure. The points in the 3D bounding box 501 are processed as described below.

FIG. 6 is an example of patches 603 created from a point cloud 600. Point cloud 600 is a single frame of point cloud media 500. Further, point cloud 600 is surrounded by a 3D bounding box 601 that is substantially similar to 3D bounding box 501. Accordingly, point cloud 600 may be coded by an encoder, such as codec system 200 and/or encoder 300, and reconstructed by a decoder, such as codec system 200 and/or decoder 400, when performing method 100.

The 3D bounding box 601 includes six faces, and hence includes six 2D rectangular frames 602 that are each positioned at a face of the 3D bounding box 601 (e.g., top, bottom, left, right, front, and back). The point cloud 600 can be converted from 3D data into 2D data by projecting the point cloud 600 onto the corresponding 2D rectangular frames 602. This results in the creation of patches 603. It should be noted that the 2D rectangular frames 602 may also be referred to as 2D bounding boxes (e.g., of the 3D bounding box 601). A patch 603 is a 2D representation of a portion of the 3D point cloud 600, where the patch 603 contains a representation of the portion of the point cloud 600 visible from the corresponding 2D rectangular frame 602. A patch 603 may be formally defined as a 2D rectangular region within an atlas associated with volumetric information. It should be noted that a representation of the point cloud 600 from a 2D rectangular frame 602 may contain multiple disjoint components. As such, a 2D rectangular frame 602 may contain a plurality of patches 603. Accordingly, a point cloud 600 may be represented by more than six patches 603. The patches 603 may also be referred to as atlas, atlas data, atlas information, and/or atlas components. By converting the 3D data into a 2D format, the patches 603 of the point cloud 600 can be coded according to video coding mechanisms, such as inter-prediction and/or intra-prediction.

Figure 7A:
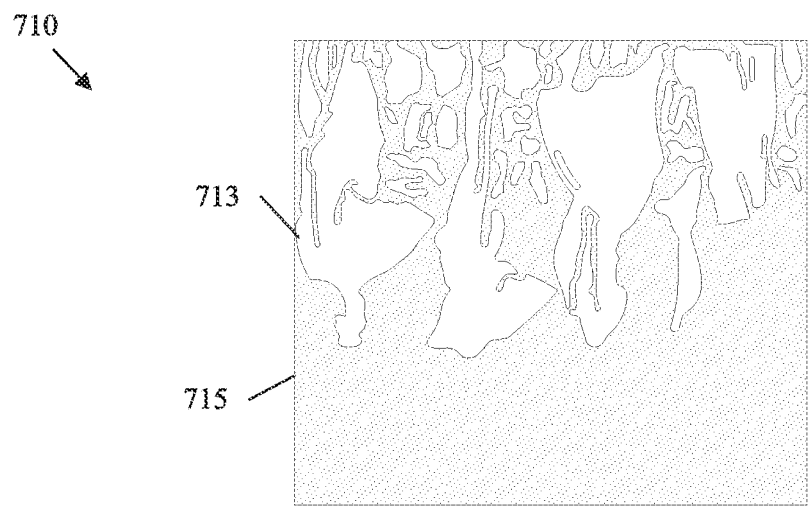
FIG. 7A illustrates an example occupancy frame associated with a set of patches.
Figure 7B:
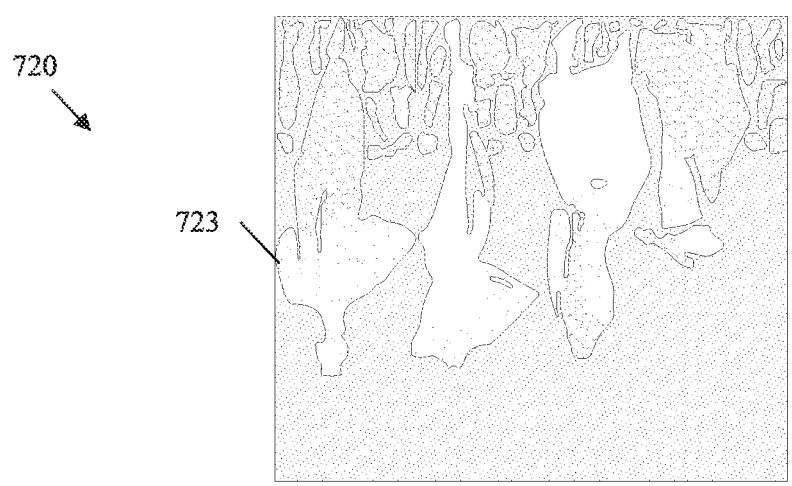
FIG. 7B illustrates an example geometry frame associated with a set of patches.
Figure 7C:
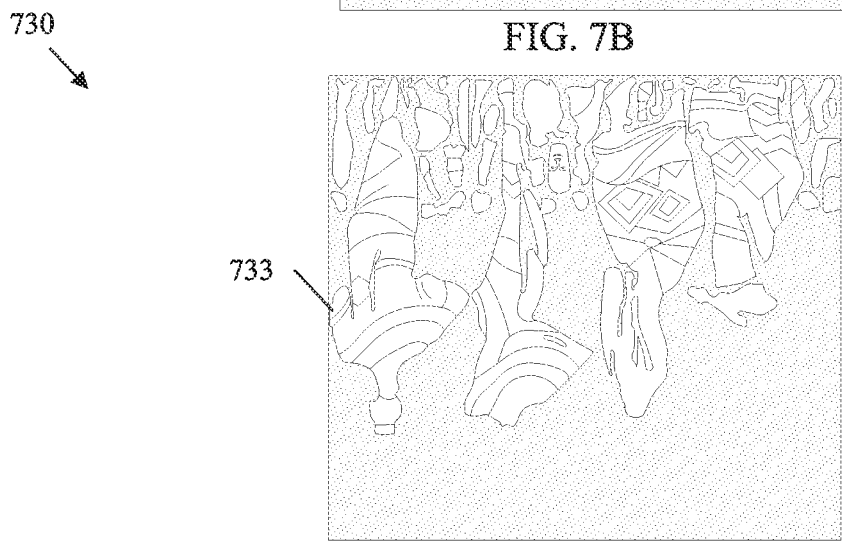
FIG. 7C illustrates an example atlas frame associated with a set of patches.

FIGS. 7A-7C illustrate mechanisms for encoding a 3D point cloud that has been converted into 2D information as described in FIG. 6. Specifically, FIG. 7A illustrates an example occupancy frame 710 associated with a set of patches, such as patches 603. The occupancy frame 710 contains occupancy 713 and 715 with value coded in binary form. Occupancy 713 and 715 are values that indicate whether atlas samples correspond to associated samples in 3D space. For example, an occupancy value of zero, depicted as occupancy 715, represents that a portion of the bounding box 601 is not occupied by one of the patches 603. Those portions of the bounding box 601 represented by the zeros do not take part in reconstruction of a volumetric representation (e.g., the point cloud 600). In contrast, an occupancy value of one, depicted as occupancy 713, represents that a portion of the bounding box 601 is occupied by one of the patches 603. Those portions of the bounding box 601 represented by the ones do take part in reconstruction of the volumetric representation (e.g., the point cloud 600). An occupancy frame 710 may be formally defined as a collection of occupancy values that constitute a 2D array and represents the entire occupancy information for a single atlas frame. Accordingly, occupancy frame 710 may indicate, for each sample position in the atlas, whether that position corresponds to a valid 3D point in the point cloud representation.

The various patches created by projecting 3D information onto 2D planes can be packed into a rectangular (or square) video frame. This approach may be advantageous because various video codecs, such as AVC, HEVC, and VVC are preconfigured to code such video frames. As such, the PCC codec can employ other video codecs to code the patches. As shown in FIG. 7A, the patches can be packed into a frame. The patches may be packed by any algorithm. For example, the patches can be packed into the frame based on size. In a particular example, the patches are included from largest to smallest. The largest patches may be placed first in any open space, with smaller patches filling in gaps once a size threshold has been crossed. For example, the largest patches may be placed toward the top left of the frame, with progressively smaller patches being placed toward the bottom right and filling in gaps once a size threshold is crossed. As shown in FIG. 7A, such a packing scheme results in blank space that does not include patch data. To avoid encoding blank space, an occupancy frame 710 is employed. An occupancy frame 710 contains all occupancy data for a point cloud at a particular instant in time. Specifically, the occupancy frame 710 contains one or more occupancy values (also known as occupancy data, occupancy information, and/or occupancy components). An occupancy 713 and/or 715 can be implemented as a 2D array corresponding to an atlas 733 (group of patches) whose values indicate, for each sample position in the atlas 733, whether that position corresponds to a valid 3D point in the point cloud representation. As shown in FIG. 7A, the occupancy frame 710 includes areas of valid data depicted as occupancy 713. The areas of valid data indicate that atlas 733/patch data is present in corresponding locations in the occupancy frame 710. The occupancy frame 710 also include areas of invalid data depicted as occupancy 715. The areas of invalid data indicate that atlas 733/patch data is not present in corresponding locations in the occupancy frame 710.

FIG. 7B illustrates an example geometry frame 720 associated with a set of patches, such as patches 603. The geometry frame 720, also known as a geometry map, provides or depicts the contour or topography of each of the patches 603. Specifically, the geometry frame 720 indicates the distance that each point in the patches 603 is away from the planar surface (e.g., the 2D rectangular frame 602) of the bounding box 601. The geometry frame 720 contains geometry 723. Geometry 723 can be defined as a set of cartesian coordinates associated with a volumetric frame. A volumetric frame is set of 3D points specified by cartesian coordinates and zero or more corresponding sets of attributes at a particular time instance. Accordingly, a volumetric frame is a combination of an occupancy frame 710, a geometry frame 720, an atlas frame 730, and optionally one or more attribute frames describing a point cloud at a specified instant. For example, geometry 723 can describe the location of each point in a 3D bounding box at a corresponding instant in time.

As noted above, the geometry frame 720 contains geometry 723, also known as geometry maps, geometry data, geometry information, and/or geometry components) for a point cloud at a particular instant in time. A geometry 723 may be implemented as a 2D array created through the aggregation of the geometry information associated with each patch, where geometry information/data is a set of Cartesian coordinates associated with a point cloud frame. Specifically, the patches are all projected from points in 3D space. Such projection has the effect of removing the 3D information from the patches. The geometry 723 retains the 3D information removed from the patches. For example, each sample in a patch is obtained from a point in 3D space. Accordingly, the geometry frame 720 may include a 3D coordinate associated with each sample in each patch. Hence, the geometry frame 720/geometry 723 can be used by a decoder to map/convert the 2D patches back into 3D space to reconstruct the 3D point cloud. Specifically, the decoder can map each patch sample onto the appropriate 3D coordinate to reconstruct the point cloud.

FIG. 7C illustrates an example atlas frame 730 associated with a set of patches, such as patches 603. The atlas frame 730 provides or depicts samples of the patches 603 in the bounding box 601. The atlas frame 730 may be formally defined as a collection of two-dimensional (2D) bounding boxes (also known as patches and/or atlas 733) projected into rectangular frames that correspond to a volume in 3D space, known as a 3D bounding box, upon which volumetric data is rendered. The atlas frame 730 may include, for example, a color component and/or luminance component, of the points in the patches 603. The color component may be based on the RGB color model, the YUV color model, or based on another known color model. The occupancy frame 710, geometry frame 720, and atlas frame 730 can be employed to code a point cloud 600 and/or point cloud media 500. As such, the occupancy frame 710, geometry frame 720, and atlas frame 730 may be coded by an encoder, such as codec system 200 and/or encoder 300, and reconstructed by a decoder, such as codec system 200 and/or decoder 400, when performing method 100.

As noted above, the atlas frame 730 contains one or more atlas 733 (also known as atlas data, atlas information, atlas components, and/or patches) for a point cloud at a particular instant in time. An atlas 733 is a collection of 2D bounding boxes projected into rectangular frames that correspond to a 3D bounding box in 3D space, where each 2D bounding box/patch represents a subset of a point cloud. Specifically, the atlas 733 contains patches created when the 3D point cloud is projected into 2D space as described with respect to FIG. 6. As such, the atlas 733/patches contain the image data (e.g., the color and light values) associated with the point cloud at a corresponding instant in time. The atlas 733 corresponds to the occupancy frame 710 of FIG. 7A and the geometry frame 720 of FIG. 7B. Specifically, the atlas 733 contains data in areas of valid data according to occupancy 713, and does not contain data in the areas of invalid data according to occupancy 715. Further, the geometry 723 contains the 3D information for the samples in the atlas 733.

It should also be noted that a point cloud can contain attributes (also known as attribute data, attribute information, and/or attribute components). Such attributes can be included in an attribute frame. An attribute may contain all data regarding a corresponding attribute of the point cloud at a particular instant in time. An example of an attribute frame is not shown as attributes may include a wide range of different data. Specifically, an attribute may be any scalar or vector property associated with each point in a point cloud such as reflectance, surface normal, time stamps, material IDs, etc. Further, attributes are optional (e.g., user defined), and may vary based on application. However, when used, the point cloud attributes may be included in an attribute frame in a manner similar to the atlas 733, geometry 723, and occupancy.

Accordingly, an encoder can compress a point cloud frame into an atlas frame 730 of atlas 733, a geometry frame 720 of geometry 723, an occupancy frame 710 of occupancy 713 and 715 values, and optionally an attribute frame of attributes (collectively a volumetric frame). The atlas frame 730, geometry frame 720, occupancy frame 710, and/or attribute frame can be further compressed, for example by different encoders for transmission to a decoder. The decoder can decompress the atlas frame 730, geometry frame 720, occupancy frame 710, and/or attribute frame. The decoder can then employ the atlas frame 730, geometry frame 720, occupancy frame 710, and/or attribute frame to reconstruct the point cloud frame to determine a reconstructed point cloud at a corresponding instant of time. The reconstructed point cloud frames can then be included in sequence to reconstruct the original point cloud sequence (e.g., for display and/or for use in data analysis). As a particular example, the atlas frame 730 and/or atlas 733 may be encoded and decoded by employing the techniques described with respect to FIGS. 1-4, for example by employing a VVC, HEVC, and/or AVC codec.

Figure 8:
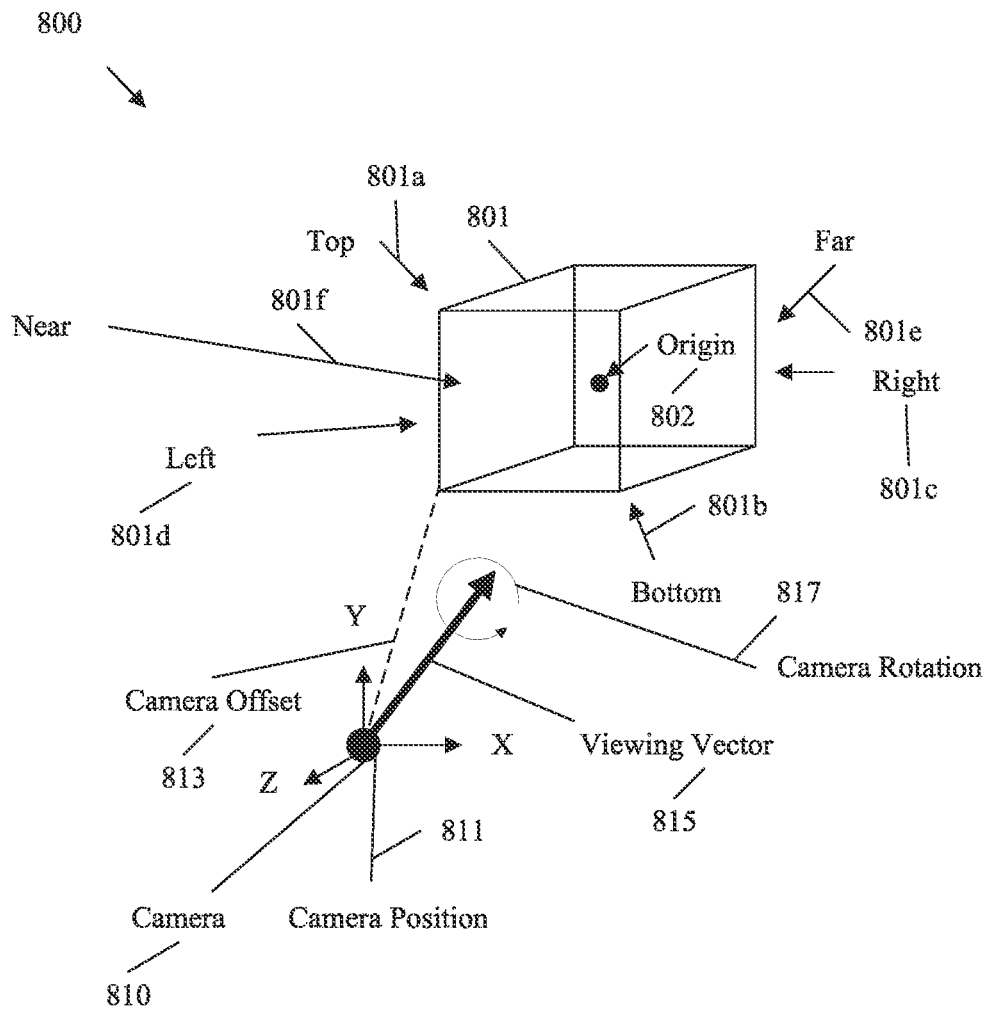
FIG. 8 is an example mechanism for defining a camera position and viewing vector for rendering a V-PCC frame.

FIG. 8 is an example mechanism 800 for defining a camera position 811 and viewing vector 815 for rendering a V-PCC frame, for example as contained in a 3D bounding box 801. In an example, a point cloud, such as point cloud media 500, can be reconstructed in the 3D bounding box 801, which may be substantially similar to 3D bounding box 501 and/or 601. As a specific example, a set of patches 603 can be decoded from an occupancy frame 710, a geometry frame 720, an atlas frame 730, and/or an attribute frame. The patches can be projected onto points in the 3D bounding box 801 to reconstruct a point cloud. The camera at the camera position 811 can be used to render the reconstructed point cloud in the 3D bounding box 801. As such, the mechanism 800 can be employed when implementing method 100, 1100, and/or 1200. Further, mechanism 800 can be employed by a codec system 200, an encoder 300, a decoder 400, a video coding device 1000, and/or a system 1300, for example when reconstructing a point cloud for error testing at an encoder or for display at a decoder. Further, data describing the mechanism 800 can be signaled by a PCC bitstream, such as V-PCC bitstream 900.

As noted above, a point cloud can be reconstructed in a 3D bounding box 801, which may be substantially similar to a 3D bounding box 501 and/or 601. Specifically, geometry can be used to place points of the point cloud in the 3D bounding box 801. Patches and/or attributes can then be projected onto the points in the 3D bounding box 801 to reconstruct a frame of a point cloud. The 3D bounding box 801 may be described as including a top 801a, a bottom 801b, a right side 801c, a left side 801d, a near side 801f, and a far side 801e. Such designations are used for clarity of discussion with respect to other components. For example, the 3D bounding box 801 may be positioned around an origin 802, which is a predefined coordinate. Hence, the top 801a is above the origin 802, the bottom 801b is below the origin 802, the right side 801c is to the right of the origin 802, the left side 801d is to the left of the origin 802, the near side 801f is in front of the origin 802, and the far side 801e is behind the origin 802.

The 3D bounding box 801 is a 3D object and contains 3D data. A camera 810 can be employed to convert the 3D data into a form that can be displayed on a 2D screen. A camera 810 is a viewport that provides a 2D view of a 3D object. Stated differently, the camera 810 can provide a 2D view of the content of the 3D bounding box 801 from a camera position 811 at an angle defined by a viewing vector 815. A camera position 811 is a coordinate that describes the center of the viewport of the camera 810. The viewing vector 815 is a vector that extends at a ninety degree angle from the front of viewport of the camera 810, and hence defines the direction that the viewport is pointed from the camera position 811. In some PCC systems, the decoder positions the camera 810 at a predefined camera position 811 and uses a predefined viewing vector 815 regardless of the content contained in the 3D bounding box 801. Such systems may require a user to take control of the camera 810 and move the camera 810 to a preferred position to render the desired content from a preferred angle. This may be problematic for some applications as the user may be unaware of a best position from which to view the desired content in the 3D bounding box 801. For example, a user may watch a PCC video of a football game. The default camera position 811 may be near and/or pointed to the center of the football field in the 3D bounding box 801. The user may wish to view the PCC video from a position near a quarterback or striker, but may not know where the quarterback or striker is located on the field in the 3D bounding box 801. This results in time consuming searching, which may create an undesirable user experience.

The present disclosure allows a content creator to select and provide a suggested camera position 811 and a suggested viewing vector 815. This allows the content creator to indicate to the user which viewport(s) are likely to contain interesting material. Further, this allows the content creator to guide the user's experience. Multiple cameras 810 can be used, and hence multiple camera positions 811 and viewing vectors 815 can be suggested to the user for selection. For each camera 810, the camera position 811 can be indicated by a camera offset 813. A camera offset 813 is a parameter that indicates distance in 3D space between a camera position 811 and a predefined point of a 3D bounding box 801 containing a point cloud. In some systems, the camera offset 813 is indicated as a measurement from the bottom 801b, left side 801d, near 801f corner of the 3D bounding box 801. As such, the camera offset 813 indicates a difference between the camera position 811 and the bottom 801b, left side 801d, near 801f corner of the 3D bounding box 801 in the X, Y, and Z axes. As such, the camera offset 813 includes an X component, a Y component, and a Z component describing such differences. The camera offset 813 can be encoded in a PCC bitstream and provides sufficient data to place the camera 810 at the camera position 811.

The viewing vector 815 for each camera 810 can be indicated by a camera rotation 817. As such, a camera rotation 817 is a parameter that indicates a viewing vector 815 pointing from a camera 810 to a 3D bounding box 801 containing a point cloud. In some examples, the camera rotation 817 is described in quaternion representation. A quaternion representation is a representation of a vector in a complex number domain using a scalar value and three unit vectors along spatial axes. A quaternion representation can be employed to describe any vector in 3D space. The decoder can position the viewport of the camera 810 based on the camera offset 813 and the camera rotation 817 as indicated in the PCC bitstream. This viewport can then be used to render a 2D representation of the PCC content in the 3D bounding box 801 from a suggested position and angle.

In a specific implementation, matrix multiplication can be employed to accomplish such rendering. For example, the PCC content can be reconstructed by initializing a model matrix that represents the 3D bounding box 801. The geometry can be defined by positioning values representing points into the model matrix. Patches and attributes can also be projected onto the geometry by correlation with such points in the model matrix. Various transforms can then be applied to the model matrix. For example, the camera 810 information can be applied to the model matrix as a transform into order to render a 2D image from the 3D point cloud. For example, the camera offset 813 can be applied as an offset matrix and the camera rotation 817 can be applied as a rotation matrix. An offset matrix is a matrix representation of a camera offset 813 that can be applied to transform a 3D model of points in a model matrix into a 2D representation. In a specific example, the offset matrix can be represented as follows:

$$OffsetMatrix = \begin{bmatrix} 1 & 0 & 0 & Offset[0] \\ 0 & 1 & 0 & Offset[1] \\ 0 & 0 & 1 & Offset[2] \\ 0 & 0 & 0 & 1 \end{bmatrix}$$

where offset[0], offset[1], and offset[2] include the X, Y, and Z components, respectively, of the camera offset 813. The one values can also be swapped out with scaling factors to scale the PCC content.

The rotation matrix is a matrix representation of a camera rotation 817 that can be applied to transform a 3D model of points in a model matrix into a 2D representation. The rotation matrix may include the quaternion values of the camera rotation 817 for application to the model matrix. In a specific example, the rotation matrix can be represented as follows:

$$\begin{bmatrix} 1-2*(qY^2+qZ^2) & 2*(qX*qY-qZ*qW) & 2*(qX*qZ+qY*qW) & 0 \\ 2*(qX*qY+qZ*qW) & 1-2*(qX^2+qZ^2) & 2*(qY*qZ-qX*qW) & 0 \\ 2*(qX*qZ-qY*qW) & 2*(qY*qZ+qX*qW) & 1-2*(qX^2+qY^2) & 0 \\ 0 & 0 & 0 & 1 \end{bmatrix}$$

where qX specifies an X component for the camera rotation 817, qY specifies a Y component for the camera rotation 817, qZ specifies a Z component for the camera rotation 817, and qW specifies a scalar component for the for the camera rotation 817. qW can be calculated as follows:

$$qW = \text{Sqrt}(1-(qX^2+qY^2+qZ^2))$$

As such, the encoder can signal the camera rotation 817 by encoding qX, qY, and qZ. The decoder can then compute qW based on the qX, qY, and qZ. The decoder can then multiply the model matrix by the offset matrix and the rotation matrix in order to obtain a 2D rendering of the PCC content in the 3D bounding box 801 from the viewport defined by the camera position 811 and the viewing vector 815. The result is that selection of the indicated camera 810 by the user, or selection by default, causes the user to see the content in the 3D bounding box 801 from the position and angle as intended by the content creator. The following describes signaling of such data in more detail. Hence, the present example increases functionality at both an encoder and decoder by creating predetermined and selectable viewing positions and angles for PCC video content. Further, the present disclosure supports mechanisms to increase coding efficiency by signaling such data in a minimalist fashion, and hence supports a reduction in processor, memory, and/or network resource usage at an encoder and/or a decoder.

Figure 9:
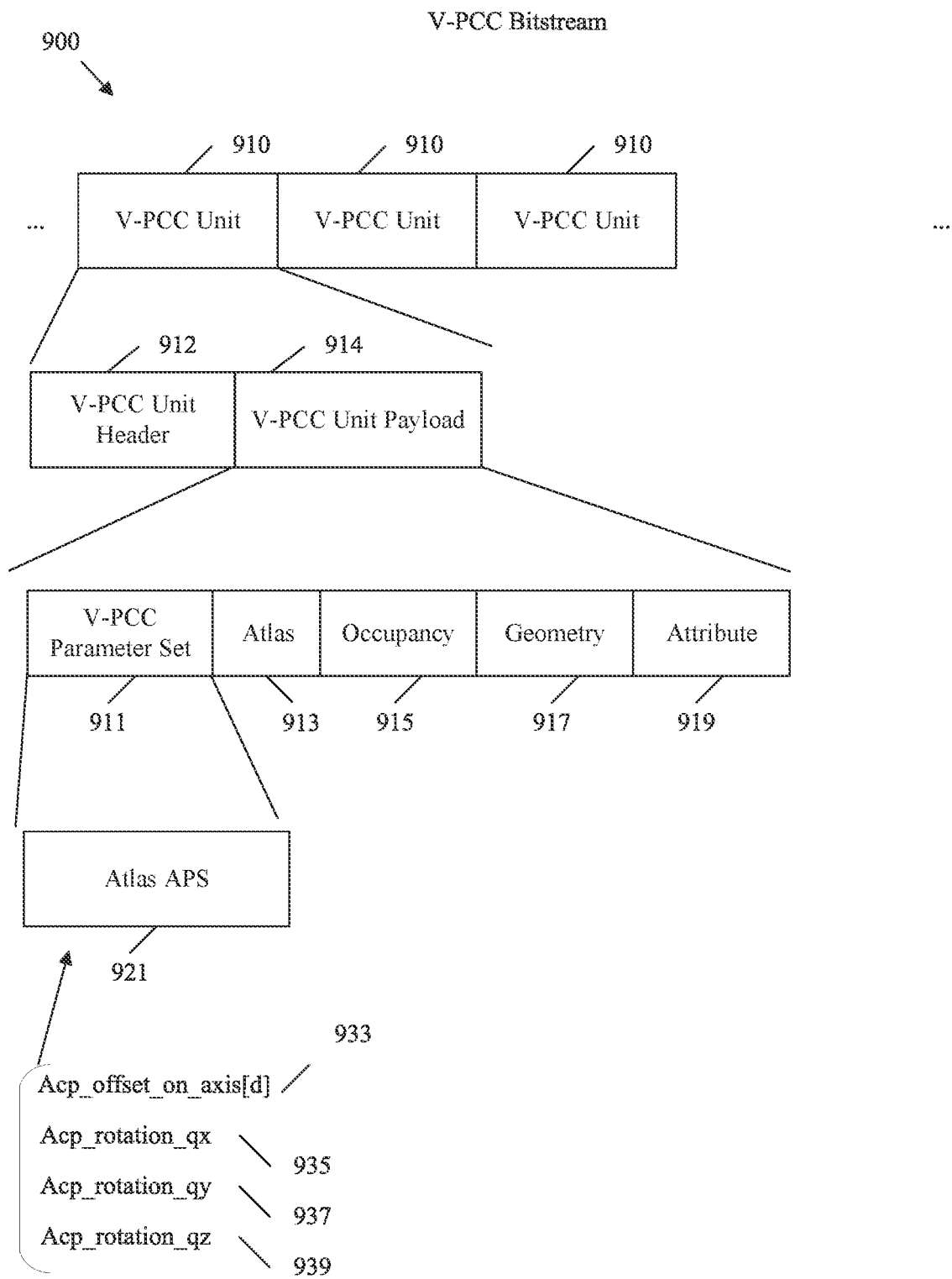
FIG. 9 is a schematic diagram illustrating an example V-PCC bitstream for use in signaling camera parameters for rendering a point cloud.

FIG. 9 is a schematic diagram illustrating an example V-PCC bitstream 900 for use in signaling camera parameters for rendering a point cloud. For example, the V-PCC bitstream 900 can be generated by a codec system 200, an encoder 300, and/or a video coding device 1000 for decoding by a codec system 200, a decoder 400, and/or a video coding device 1000 according to methods 100, 1100, and/or 1200. Further, the V-PCC bitstream 900 can be used to encode a set of patches 603 from a point cloud media 500 as an occupancy frame 710, a geometry frame 720, an atlas frame 730, and/or an attribute frame. In addition, the V-PCC bitstream 900 can encode a camera offset 813 and/or a camera rotation 817 to support rendering from a signaled camera viewpoint as a decoder.

A V-PCC bitstream 900 comprises a series of V-PCC units 910. A V-PCC unit 910 is a data container sized to be placed in a data packet for transmission toward a decoder. Specifically, a V-PCC unit 910 contains a V-PCC component and/or a corresponding parameter set that is relevant to one or more volumetric frames that represents a point cloud at a corresponding instant in a V-PCC video sequence. As a specific example, a V-PCC unit 910 may be configured as a network abstraction layer (NAL) unit corresponding to a versatile video coding (VVC) standard. A NAL unit is a packet sized data container. For example, a single NAL unit is generally sized to allow for network transmission. A NAL unit may contain a header indicating the NAL unit type and a payload that contains the associated data. A V-PCC unit 910 contains a V-PCC unit payload 914 and a V-PCC unit header 912. A V-PCC unit payload 914 contains a corresponding type of video data related to a volumetric frame. A V-PCC unit header 912 is header that indicates the type of data included in the A V-PCC unit payload 914.

A V-PCC unit payload 914 may contain a V-PCC parameter set 911, an atlas frame 913, an occupancy frame 915, a geometry frame 917, and/or an attribute frame 919, depending on the example. A V-PCC parameter set 911 is a group of parameters that describe settings used to code one or more corresponding volumetric frames. As an example, a V-PCC parameter set 911 may include an atlas adaptation parameter set (APS) 921. An atlas APS 921 is syntax structure containing syntax elements/parameters that apply to one or more patches included in an atlas frame 913. For example, parameters in an atlas APS 921 may apply to all one or more (e.g., or all) patches associated with a PCC frame. A V-PCC parameter set 911 may also include other parameter sets, such as atlas frame parameter sets, atlas sequence parameter sets, video-based visual volumetric coding (V3C) parameter sets, etc. The primary distinction between the parameter sets is whether the contained parameters relate to the V-PCC at a video level (e.g., V3C parameter set), a sequence level (e.g., atlas sequence parameter set), a frame level (e.g., atlas frame parameter set), and/or a patch level (e.g., an atlas APS). Other parameter sets may also be employed for particular purposes, and the preceding is not intended as an exhaustive list.

An atlas frame 913 is a collection of 2D bounding boxes/patches/atlases projected into rectangular frames that correspond to a volume in 3D space, such as a 3D bounding box 501, 601, and/or 801, upon which volumetric data is rendered. An atlas frame 913 may be substantially similar to an atlas frame 730. An occupancy frame 915 is a collection of occupancy values that constitute a 2D array and represents the entire occupancy information for a single atlas frame. Occupancy are values that indicate whether atlas samples correspond to associated samples in 3D space. An occupancy frame 915 may be substantially similar to an occupancy frame 710. A geometry frame 917, also known as a geometry map, is a frame containing geometry patch information projected at a particular depth. A geometry is a set of cartesian coordinates associated with a volumetric frame. A geometry frame 917 may be substantially similar to a geometry frame 720. An attribute frame 919 is a frame that contains a scalar or vector property optionally associated with each point in a volumetric frame of a point cloud such as color, reflectance, surface normal, time stamps, material identifier (ID), etc. A volumetric frame is set of 3D points specified by cartesian coordinates and zero or more corresponding sets of attributes at a particular time instance. A video of a point cloud includes a series of volumetric frames. As such, the V-PCC parameter set 911 contains parameter sets indicating how one or more volumetric frames should be decoded and the atlas frame 913, occupancy frame 915, the geometry frame 917, and the attribute frame 919 contain the video data to reconstruct the volumetric frames.

As noted above, some V-PCC systems always position a camera to render a 2D view of a 3D point cloud in a default position. In such systems, data from the atlas frame 913, occupancy frame 915, the geometry frame 917, and the attribute frame 919 are used to reconstruct a volumetric frame. The volumetric frame is then rendered by a camera in a default position. This approach may not be beneficial in many situations as the default position does not change from video to video, and hence provides a view of the volumetric frame that is not particularly likely to show useful information.

The present disclosure allows a content creator to select and provide a suggested camera position and a suggested viewing vector. This allows the content creator to indicate to the user which viewport(s) are likely to contain an interesting view of the volumetric frame. Further, this allows the content creator to guide the user's experience. In a specific example, the atlas APS 921 can be used to code the suggested camera position and a suggested viewing vector. For example, the atlas APS 921 can include one or more atlas camera parameter (ACP) syntax structures. Each ACP syntax structure can contain data describing a camera for use in rendering. For example, the atlas APS 921 can encode an ACP syntax structure that codes the camera position as a camera offset, such as camera offset 813. Further, the ACP syntax structure can code the camera viewing vector, for example as a camera rotation 817 in a quaternion representation.

In a specific implementation, the camera offset can be coded as ACP offset on axis d (Acp_offset_on_axis[d]) 933. For example, the Acp_offset_on_axis[d] 933 may contain an X, Y, and a Z component of the camera offset where d is a counter variable to indicate which offset component is indicated. For example, d can be set to zero, one, or two to indicate components X, Y, or Z, respectively. In a specific implementation, the Acp_offset_on_axis[d] 933 can be defined as follows. Acp_offset_on_axis[d] 933 indicates the value of the offset, denoted as Offset[d], along the d axis for the current camera model in increments of $2^{-16}$. The value of acp_offset_on_axis[d] 933 should be in the range of $-2^{31}$ to $2^{31}-1$, inclusive, where d is in the range of zero to two, inclusive. The values of d equal to zero, one, and two correspond to the X, Y, and Z axis, respectively. When not present, acp_offset_on_axis[d] can be inferred to be equal to zero. Offset[d] can be determined according to Offset[d] =acp_offset_on_axis[d]÷$2^{16}$. The decoder can generate an offset matrix based on the data in Acp_offset_on_axis[d] 933. An offset matrix can be represented as follows:

$$OffsetMatrix = \begin{bmatrix} 1 & 0 & 0 & Offset[0] \\ 0 & 1 & 0 & Offset[1] \\ 0 & 0 & 1 & Offset[2] \\ 0 & 0 & 0 & 1 \end{bmatrix}$$

where Offset[0], Offset[1], and Offset[2] are the X, Y, and Z displacements of the camera and the 1s can be replaced as desired with scaling factors.

Further, the unit vector quaternion components of the camera rotation can be encoded as ACP rotation qx (Acp_rotation_qx) 935, ACP rotation qy (Acp_rotation_qy) 937, and ACP rotation qz (Acp_rotation_qz) 939. The scalar component of the camera rotation can be determined by the decoder based on the unit vector components. In a specific example, Acp_rotation_qx 935, Acp_rotation_qy 937, and Acp_rotation_qz 939 can be defined as follows. Acp_rotation_qx 935 specifies the x component, qX, for the rotation of the current camera model using the quaternion representation. The value of acp_rotation_qx should be in the range of $-2^{14}$ to $2^{14}$, inclusive. When not present, Acp_rotation_qx 939 can be inferred to be equal to zero. The value of qX can be determined according to qX=acp_rotation_qx÷$2^{14}$.

Further, Acp_rotation_qy 937 specifies the y component, qY, for the rotation of the current camera model using the quaternion representation. The value of acp_rotation_qy 937 should be in the range of $-2^{14}$ to $2^{14}$, inclusive. When not present, Acp_rotation_qy 937 can be inferred to be equal to zero. The value of qY can be determined according to qY=acp_rotation_qy÷$2^{14}$.

In addition, Acp_rotation_qz 939 specifies the z component, qZ, for the rotation of the current camera model using the quaternion representation. The value of Acp_rotation_qz 939 should be in the range of $-2^{14}$ to $2^{14}$, inclusive. When not present, Acp_rotation_qz 939 can be inferred to be equal to zero. The value of qZ can be determined according to qZ=acp_rotation_qz÷$2^{14}$.

The fourth/scalar component, qW, for the rotation of the current camera model using the quaternion representation can be calculated as follows qW=Sqrt(1−(qX2+qY2+qZ2)). The decoder can generate a rotation matrix based on the data from Acp_rotation_qx 935, Acp_rotation_qy 937, and Acp_rotation_qz 939. For example, a unit quaternion can be represented as a rotation matrix as follows:

$$\begin{bmatrix} 1-2*(qY^2+qZ^2) & 2*(qX*qY-qZ*qW) & 2*(qX*qZ+qY*qW) & 0 \\ 2*(qX*qY+qZ*qW) & 1-2*(qX^2+qZ^2) & 2*(qY*qZ-qX*qW) & 0 \\ 2*(qX*qZ-qY*qW) & 2*(qY*qZ+qX*qW) & 1-2*(qX^2+qY^2) & 0 \\ 0 & 0 & 0 & 1 \end{bmatrix}$$

As such, an encoder can code a camera offset in the V-PCC bitstream 900 as an Acp_offset_on_axis[d] 933 and a camera rotation as an Acp_rotation_qx 935, Acp_rotation_qy 937, and Acp_rotation_qz 939. The decoder can reconstruct a point cloud in a 3D bounding box by including corresponding PCC video data in a model matrix. The decoder can then generate an offset matrix describing the camera offset based on Acp_offset_on_axis[d] 933 and a rotation matrix describing the camera rotation based on Acp_rotation_qx 935, Acp_rotation_qy 937, and Acp_rotation_qz 939. The decoder can then render a 2D view of the 3D point cloud from the indicated viewport by applying the offset matrix and the rotation matrix to the model matrix, for example via matrix multiplication. Hence, the Acp_offset_on_axis[d] 933, Acp_rotation_qx 935, Acp_rotation_qy 937, and Acp_rotation_qz 939 contain data that can be used as a transform to transform a reconstructed point cloud from a 3D volumetric representation to a 2D representation from an indicated camera position and viewing angle that can be displayed on a 2D screen for viewing by an end user. As such, the Acp_offset_on_axis[d] 933, Acp_rotation_qx 935, Acp_rotation_qy 937, and Acp_rotation_qz 939 can be used by a content creator to indicate a preferred viewing position and angle, and hence can be used by an encoder to direct a user's experience of the 3D V-PCC content coded by the V-PCC bitstream 900.

A specific implementation of the preceding information is now described in more detail herein below. 3D reconstructed information provides a description of the volume and shape of an object. However, several additional parameters also exist, such as extrinsic camera parameters including direction and position in space. Further, a scaling parameter provides information regarding the point size and spacing in a physical space. However, some PCC systems employ no information that would define a director's default view of an immersive object. To define a camera, two sets of parameters are employed. These include a position in 3D space, which may be defined as a translation with respect to the point cloud frame origin point. Camera parameters further include rotation with respect to the coordinate system of the point cloud frame. In order to provide rotation and translation parameters for the camera, messages in the PCC bitstream are modified to contain the list of corresponding parameters.

Extrinsic camera parameters in the 3D rendering pipeline may be defined as follows. Specifically, the definition of the camera in the world coordinates includes two factors. The first is an offset parameter, which is an X, Y, and Z displacement of the camera with respect to the world coordinate system. An offset matrix, denoted as T, can be defined as follows:

$$T = \begin{bmatrix} 1 & 0 & 0 & X \\ 0 & 1 & 0 & Y \\ 0 & 0 & 1 & Z \\ 0 & 0 & 0 & 1 \end{bmatrix};$$

where X, Y, and Z are the X, Y, and Z displacements of the camera and the 1s can be replaced as desired with scaling factors.

The second parameter is an orientation matrix, denoted as R, that defines the camera rotation with respect to the world coordinate system, an example of which is described as follows:

$$R = \begin{bmatrix} \cos\beta\cos\gamma & -\cos\beta\sin\gamma & \sin\beta & 0 \\ \sin\alpha\sin\beta\cos\gamma + \cos\alpha\sin\gamma & -\sin\alpha\sin\beta\sin\gamma + \cos\alpha\cos\gamma & -\sin\alpha\cos\beta & 0 \\ -\cos\alpha\sin\beta\cos\gamma + \sin\alpha\sin\gamma & \cos\alpha\sin\beta\sin\gamma + \sin\alpha\cos\gamma & \cos\alpha\cos\beta & 0 \\ 0 & 0 & 0 & 1 \end{bmatrix}$$

Where $\alpha$, $\beta$, $\gamma$ are rotation angles with respect to x, y and z world coordinates axis respectively. The resulting transform may be applied to the bounding box used in the scene graph and containing the reconstructed point cloud. By employing these parameters, several predefined camera positions may be suggested by a content creator. Such camera positions may be referred to as a director's view.

In an example implementation, a supplemental enhancement information (SEI) message may carry geometry transformation parameters and may be modified by adding the following information. For example, one or more cameras maybe associated with the model to indicate the predefined or directors view that would be used to direct viewers attention to a certain action within the volumetric scene. Each camera can be indicated with the offset along each axis in the global scene coordinate system. Each camera can be characterized with a certain rotation along each axis. In another example, each camera rotation may be characterized with a quaternion x, y, z; and $w^2=1-(x^2+y^2+z^2)$ A geometry transformation parameters SEI message syntax containing the parameters described above can be described as follows:

| | Descriptor |
|---|---|
| geometry_transformation_params( payloadSize ) { | |
|   gtp_cancel_flag | u(1) |
|   if( !gtp_cancel_flag ) { | |
|     gtp_smoothing_enabled_flag | u(1) |
|     gtp_scale_enabled_flag | u(1) |
|     gtp_offset_enabled_flag | u(1) |
|     gtp_rotation_enabled_flag | u(1) |
|     gtp_point_size_info_enabled_flag | u(1) |
|     gtp_point_shape_info_enabled_flag | u(1) |
|     gtp_num_camera_info | u(3) |
|     if ( gtp_smoothing_enabled_flag ) { | |
|       gtp_smoothing_grid_size_minus2 | u(7) |
|       gtp_smoothing_threshold | u(8) |
|     } | |
|     if( gtp_scale_enabled_flag) | |
|       for( d = 0; d < 3; d++ ) | |
|         gtp_geometry_scale_on_axis[ d ] | u(32) |
|     if( gtp_offset_enabled_flag) | |
|       for( d = 0; d < 3; d++ ) | |
|         gtp_geometry_offset_on_axis[ d ] | i(32) |
|     if( gtp_rotation_enabled_flag ) { | |

-continued

|  | Descriptor |
| --- | --- |
| gtp_rotation_x | i(16) |
| gtp_rotation_y | i(16) |
| gtp_rotation_z | i(16) |
| } | |
| if( gtp_point_size_info_enabled_flag ) | |
|   gtp_point_size_info_minus1 | u(16) |
| if( gtp_point_shape_info_enabled_flag ) | |
|   gtp_point_shape_info | u(4) |
| if( gtp_num_camera_info > 0 ) { | |
|   for ( i = 0; i < gtp_num_camera_info; i++ ) { | |
|     for( d = 0; d < 3; d++ ) | |
|       gtp_camera_offset_on_axis[ i ][ d ] | i(16) |
|     for( d = 0; d < 3; d++ ) | |
|       gtp_camera_orientation_on_axis[ i ][ d ] | i(16) |
|     } | |
|   } | |
| } | |

Example semantics changes to the geometry transformation parameters SEI message semantics are as follows. A gtp_num_camera_info indicates the number of predefined camera presets. A gtp_num_camera_info equal to zero specifies that the camera information is not present. When not present, the value of gtp_num_camera_info may be inferred to be equal to zero. A gtp_camera_offset_on_axis [i][d] indicates the value of the i-th camera offset along the d axis. The value of gtp_geometry_scale_on_axis[i][d], may be in the range of zero to $2^{32}-1$, inclusive, where d is in the range of zero to two, inclusive. The values of d equal to zero, one, and two correspond to the X, Y, and Z axis, respectively. When not present, gtp_geometry_scale_on_axis[i][d] may be inferred to be equal to zero. A gtp_camera_orientation_on_axis[i][d] specifies the d-th component, Orientation[i][d], for the i-th camera direction. The value of gtp_camera_orientation_on_axis[i][d] may be in the range of negative $2^{15}$ to positive $2^{15}-1$, inclusive. The values of d equal to zero, one, and two correspond to the X, Y, and Z rotation components, respectively. When not present, gtp_camera_orientation_on_axis[i][d] shall be inferred to be equal to zero. The value of Orientation[i][d] may computed as follows:

$$\text{Orientation}[i][d] = gtp\_camera\_orientation\_on\_axis[i][d] \div 2^{15}$$

A quaternion approach may also be used for coding a camera rotation. Three vectors may be used to define a camera. They include position, view, and up. A first person camera may instead be defined by rotating a view vector. With quaternion a vector can be rotated around an arbitrary axis. To achieve this, a view vector can be converted into a quaternion. A rotation quaternion can then be defined. The rotation quaternion can then be applied to the view quaternion to make the rotation. To create the view quaternion (V), the x, y, and z values are taken from the view vector and a zero can be added as a scalar component (w). Thus, V=[0, view]. Then a quaternion can be generated to represent the rotation. To do this, a vector to act as the center of rotation (A) and an angle of rotation (theta) can be obtained. The formula to build a rotation quaternion (R), is as follows: vector A=[x, y, z]R.x=A.x*sin(theta/2) R.y=A.y*sin(theta/2) R.z=A.z*sin(theta/2) R.w=cos(theta/2). The rotation quaternion R defines this rotation. After the rotation, the quaternion representing a view, denoted as W, is employed. The rotation operation is described as W=R*V*R' where R' is the conjugate of R. The fourth component, RotationW, for the geometry rotation of the current point cloud image using the quaternion representation can be calculated as follows:

$$\text{Rotation}X = \text{Orientation}[0]$$

$$\text{Rotation}Y = \text{Orientation}[1]$$

$$\text{Rotation}Z = \text{Orientation}[2]$$

$$\text{Rotation}W = \text{Sqrt}(1-(\text{Orientation}[0]2+\text{Orientation}[1]2+\text{Orientation}[2]2))$$

The forgoing describes an example V-PCC message that provides a set of camera displacement parameters for use in a scene, with respect to the point cloud frame origin point. The camera position can be indicated by the axis offset in x, y, and z direction within the scene. The V-PCC message may also provide a set of camera orientation parameters in the scene. The camera orientation can be indicated by alpha, beta, and gamma rotation angles representing the Euler rotation for x, y and z axis. Alternatively, the camera orientation can be indicated by RotationX, RotationY, r_z, and r_w representing rotation in quaternion notation, where the r_w rotation is derived.

Figure 10:
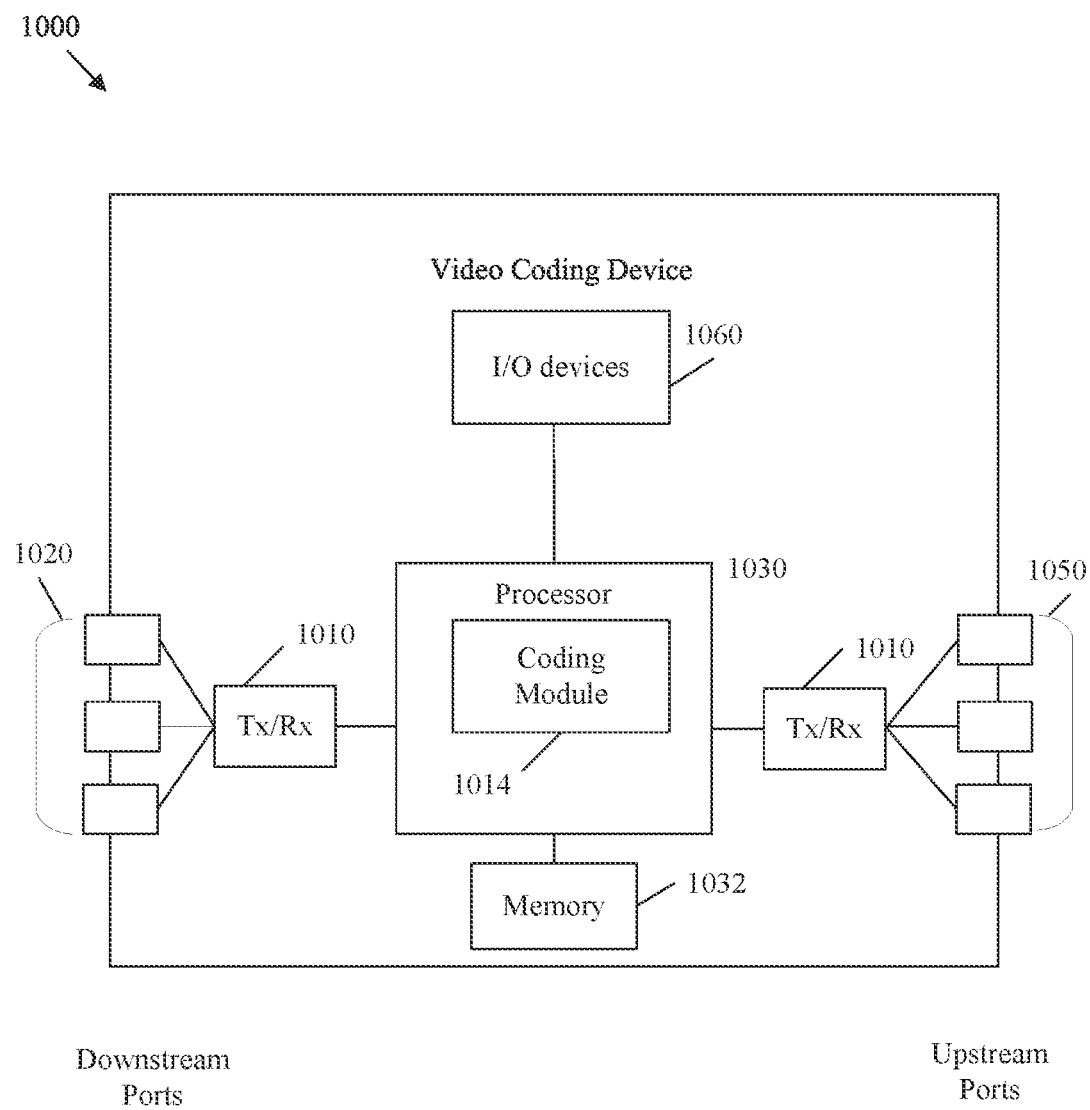
FIG. 10 is a schematic diagram of an example video coding device.

FIG. 10 is a schematic diagram of an example video coding device 1000. The video coding device 1000 is suitable for implementing the disclosed examples/embodiments as described herein. The video coding device 1000 comprises downstream ports 1020, upstream ports 1050, and/or transceiver units (Tx/Rx) 1010, including transmitters and/or receivers for communicating data upstream and/or downstream over a network. The video coding device 1000 also includes a processor 1030 including a logic unit and/or central processing unit (CPU) to process the data and a memory 1032 for storing the data. The video coding device 1000 may also comprise electrical, optical-to-electrical (OE) components, electrical-to-optical (EO) components, and/or wireless communication components coupled to the upstream ports 1050 and/or downstream ports 1020 for communication of data via electrical, optical, or wireless communication networks. The video coding device 1000 may also include input and/or output (I/O) devices 1060 for communicating data to and from a user. The I/O devices 1060 may include output devices such as a display for displaying video data, speakers for outputting audio data, etc. The I/O devices 1060 may also include input devices, such as a keyboard, mouse, trackball, etc., and/or corresponding interfaces for interacting with such output devices.

The processor 1030 is implemented by hardware and software. The processor 1030 may be implemented as one or more CPU chips, cores (e.g., as a multi-core processor), field-programmable gate arrays (FPGAs), application specific integrated circuits (ASICs), and digital signal processors (DSPs). The processor 1030 is in communication with the downstream ports 1020, Tx/Rx 1010, upstream ports 1050, and memory 1032. The processor 1030 comprises a coding module 1014. The coding module 1014 implements the disclosed embodiments described herein, such as methods 100, 1100, and 1200, which may employ point cloud media 500 separated into a set of patches 603 and encoded into an occupancy frame 710, a geometry frame 720, and an atlas frame 730 in a V-PCC bitstream 900. The coding module 1014 may also implement mechanism 800 and any other method/mechanism described herein. Further, the coding module 1014 may implement a codec system 200, an encoder 300, and/or a decoder 400. For example, a coding module 1014 at an encoder can encode a camera offset and/or a camera rotation in a PCC bitstream. Further, a coding module 1014 at decoder can then use the camera offset to generate an offset matrix and/or use the camera rotation to generate a rotation matrix. The decoder can then apply the offset matrix and the rotation matrix to a model matrix containing the reconstructed point cloud to render a point cloud frame from the indicated position and angle. This allows the encoder to specify, and for a decoder to use, one or more predefined camera positions and angles to display a reconstructed point cloud for a user. Hence, coding module 1014 causes the video coding device 1000 to provide additional functionality and/or coding efficiency when coding video data. As such, the coding module 1014 improves the functionality of the video coding device 1000 as well as addresses problems that are specific to the video coding arts. Further, the coding module 1014 effects a transformation of the video coding device 1000 to a different state. Alternatively, the coding module 1014 can be implemented as instructions stored in the memory 1032 and executed by the processor 1030 (e.g., as a computer program product stored on a non-transitory medium).

Figure 11:
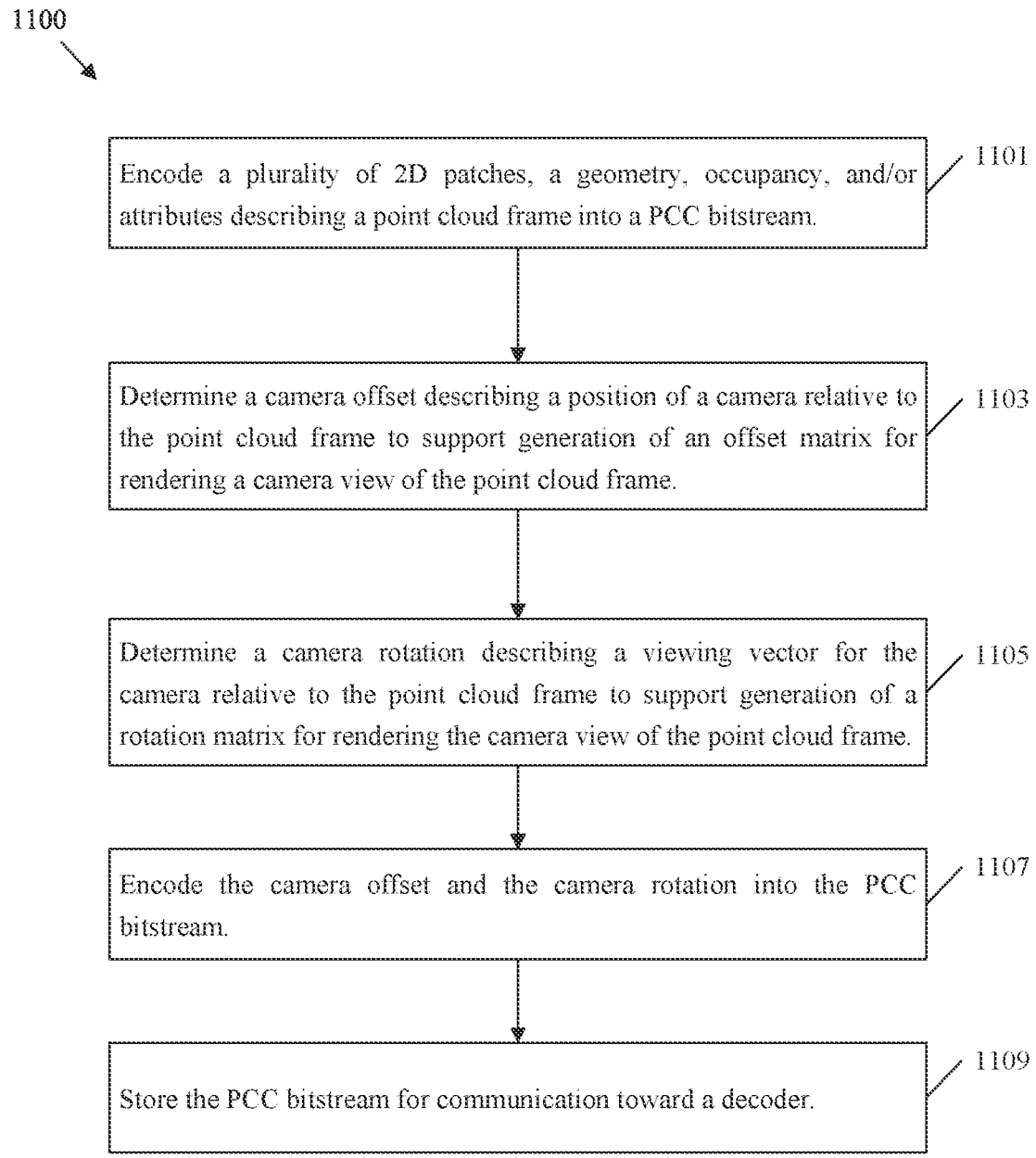
FIG. 11 is a flowchart of an example method of encoding a V-PCC bitstream to signal camera parameters for rendering a point cloud.

The memory 1032 comprises one or more memory types such as disks, tape drives, solid-state drives, read only memory (ROM), random access memory (RAM), flash memory, ternary content-addressable memory (TCAM), static random-access memory (SRAM), etc. The memory 1032 may be used as an over-flow data storage device, to store programs when such programs are selected for execution, and to store instructions and data that are read during program execution FIG. 11 is a flowchart of an example method 1100 of encoding a V-PCC bitstream, such as V-PCC bitstream 900, to signal camera parameters for rendering a point cloud, for example based on mechanism 800. Method 1100 may be employed by an encoder, such as a codec system 200, an encoder 300, and/or a video coding device 1000 when performing method 100. As such, the method 1100 may operate on point cloud media 500, which is separated into a set of patches 603 and encoded into an occupancy frame 710, a geometry frame 720, an atlas frame 730, and/or an attribute frame.

Method 1100 may begin when a content creator determines to encoded video as a 3D point cloud according to PCC mechanisms. For example, an encoder may begin encoding PCC content for a plurality of frames based on input from a content creator. At step 1101, the encoder encodes a plurality of 2D patches, a geometry, an occupancy, and/or attributes describing a point cloud frame. The encoder can encode these items into a PCC bitstream, such as V-PCC bitstream 900 (e.g., into an atlas frame 913, a geometry frame 917, an occupancy frame 915, and an attribute frame 919). Such data may be sufficient to reconstruct a volumetric/point cloud frame at a decoder. For example, the occupancy can be used to remove certain compression related coding artefacts in the atlas frame that are not actual video data. The geometry can be included in the model matrix to recreate the 3D point cloud in a 3D bounding box, and the 2D patches and/or attributes can be projected onto the geometry.

At step 1103, the encoder can determine a camera offset describing a position of a camera relative to the point cloud frame. The camera offset can be determined based on user inputs. For example, the content creator can indicate one or more preferred positions of various cameras to direct the viewers view of the video content. The camera offset indicates such a preferred camera position and can be used by a decoder to support generation of an offset matrix for rendering a camera view of the point cloud frame after the point cloud has been reconstructed at the decoder (e.g., based on the data from step 1101). For example, the camera offset may indicate a first offset corresponding to an X axis, a second offset corresponding to a Y axis, and a third offset corresponding to a Z axis. In a specific implementation, the camera offset can be included in an acp_offset_on_axis[d] 933 in an ACP syntax structure in an atlas APS 921. This provides sufficient information for a decoder to generate an offset matrix for rendering a 2D view of the 3D point cloud. In an example, the offset matrix comprises four rows and four columns. The first offset (e.g., X component) can be positioned at row one column four, the second offset (e.g., Y component) can be positioned at row two column four, and the third offset (e.g., Z component) is positioned at row three column four. In an example, such an offset matrix can be represented as follows:

$$OffsetMatrix = \begin{bmatrix} 1 & 0 & 0 & \text{Offset}[0] \\ 0 & 1 & 0 & \text{Offset}[1] \\ 0 & 0 & 1 & \text{Offset}[2] \\ 0 & 0 & 0 & 1 \end{bmatrix}$$

At step 1105, the encoder can determine a camera rotation describing a viewing vector for the camera relative to the point cloud frame. The camera rotation can be determined based on user inputs. For example, the content creator can indicate one or more preferred viewing angles of various cameras to direct the viewers view of the video content. The camera rotation indicates such a preferred camera view and can be used by a decoder to support generation of a rotation matrix for rendering the camera view of the point cloud frame after the point cloud has been reconstructed at the decoder (e.g., based on the data from step 1101). As described above, the viewing angle may be described by a viewing vector that extends at a ninety degree angle from a plane that describes a viewport associated with the camera. As such, the camera position and viewing angle describes the position and orientation of the viewport selected for the user. The viewing vector may be described as a camera rotation in quaternion representation. For example, the camera rotation specifies an X component for a rotation of the camera using quaternion representation, a Y component for the rotation of the camera using quaternion representation, and a Z component for the rotation of the camera using quaternion representation. The camera rotation also includes a W component that can be calculated from the X, Y, and Z components. For example, the W component can be calculated according to qW=Sqrt(1−qX2+qY2+qZ2)), where qW, qX, qY, and qZ represents the W component, the X component, the Y component, and the Z component, respectively, and where Sqrt is a square root function In a specific implementation, the qX, qY, and qZ components of the camera rotation can be included in an acp_rotation_qx 935, an acp_rotation_qy 937, and an acp_rotation_qz 939, respectively, in an ACP syntax structure in an atlas APS 921. The qW may not be coded and may instead by calculated at the decoder based on the qX, qY, and qZ components as described above. This provides sufficient information for a decoder to generate a rotation matrix for rendering a 2D view of the 3D point cloud. In an example, the rotation matrix comprises four rows and four columns and may contain various combinations of the qW, qX, qY, and qZ components as follows:

$$\begin{bmatrix} 1-2*(qY^2+qZ^2) & 2*(qX*qY-qZ*qW) & 2*(qX*qZ+qY*qW) & 0 \\ 2*(qX*qY+qZ*qW) & 1-2*(qX^2+qZ^2) & 2*(qY*qZ-qX*qW) & 0 \\ 2*(qX*qZ-qY*qW) & 2*(qY*qZ+qX*qW) & 1-2*(qX^2+qY^2) & 0 \\ 0 & 0 & 0 & 1 \end{bmatrix}$$

As such, the rotation matrix includes the X component, the Y component, the Z component, and a W component for the rotation of the camera using quaternion representation At step 1107, the encoder encodes the camera offset and the camera rotation into the PCC bitstream. The PCC bitstream can also be stored for communication toward a decoder at step 1109. The PCC bitstream may be forwarded to a content server for long term storage and/or transmitted to a decoder/end user upon request. As such, the content creator can select and encode one or more camera positions and viewing angles in the V-PCC bitstream in order to direct a viewer's viewpoint upon viewing the reconstructed V-PCC content at a decoder. Hence, method 1100 increases functionality at both an encoder and decoder by creating predetermined and selectable viewing positions and angles for PCC video content. Further, method 1100 supports mechanisms to increase coding efficiency, for example by omitting qW from the V-PCC bitstream. Hence, method 1100 supports a reduction in processor, memory, and/or network resource usage at an encoder and/or a decoder.

Figure 12:
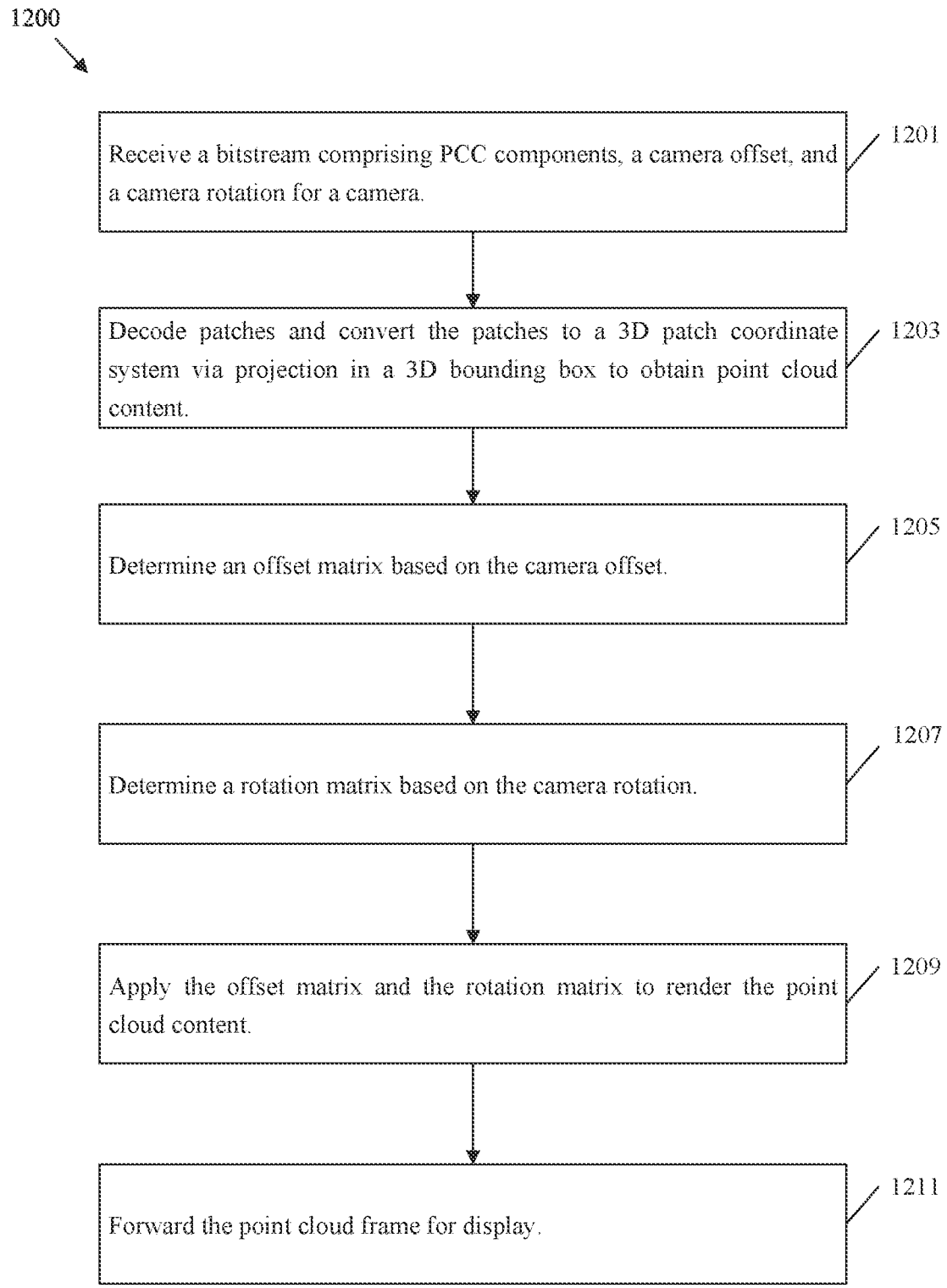
FIG. 12 is a flowchart of an example method of decoding a V-PCC bitstream to render a point cloud based on signaled camera parameters.

FIG. 12 is a flowchart of an example method of decoding a V-PCC bitstream, such as V-PCC bitstream 900, to render a point cloud based on signaled camera parameters, for example based on mechanism 800. Method 1200 may be employed by a decoder, such as a codec system 200, a decoder 400, and/or a video coding device 1000 when performing method 100. As such, the method 1200 may operate on point cloud media 500, which is separated into a set of patches 603 and encoded into an occupancy frame 710, a geometry frame 720, an atlas frame 730, and/or an attribute frame.

Method 1200 may begin when a decoder begins receiving a V-PCC bitstream of coded data representing a video sequence of point clouds, for example as a result of method 1100. At step 1201, the decoder receives a PCC bitstream comprising PCC components. Specifically, the bitstream may comprising a plurality of 2D patches in an atlas frame, geometry in a geometry frame, occupancy in an occupancy frame and/or attributes in an attribute frame. The bitstream may also comprise one or more camera offsets and one or more camera rotations for one or more cameras. The camera offsets and camera rotations defined viewports for viewing the V-PCC content as indicted by a content creator.

At step 1203, the decoder may initialize a model matrix representing a 3D bounding box and include the geometry in the model matrix. The decoder can then decode the patches and convert the patches to a 3D patch coordinate system by projecting the patches onto the points in the 3D bounding box/model matrix to obtain a point cloud frame of point cloud content. Attributes, if present, may also be projected onto the geometry to create a reconstructed point cloud frame/volumetric frame.

At step 1205, the decoder can determine an offset matrix based on the camera offset for the camera. For example, the camera offset may indicate a first offset corresponding to an X axis, a second offset corresponding to a Y axis, and a third offset corresponding to a Z axis. Such offsets indicate a displacement in each axis between the camera positions and a predetermined point in the 3D bounding box, such as the bottom, left, near corner of the 3D bounding box. In a specific implementation, the camera offset can be included in an acp_offset_on_axis[d] 933 in an ACP syntax structure in an atlas APS 921. This provides sufficient information for the decoder to generate/determine an offset matrix for rendering a 2D view of the 3D point cloud. In an example, the offset matrix comprises four rows and four columns. The first offset (e.g., X component) can be positioned at row one column four, the second offset (e.g., Y component) can be positioned at row two column four, and the third offset (e.g., Z component) is positioned at row three column four. In an example, such an offset matrix can be represented as follows:

$$OffsetMatrix = \begin{bmatrix} 1 & 0 & 0 & Offset[0] \\ 0 & 1 & 0 & Offset[1] \\ 0 & 0 & 1 & Offset[2] \\ 0 & 0 & 0 & 1 \end{bmatrix}$$

At step 1207, the decoder can determine a rotation matrix based on the camera rotation for the camera. As described above, a viewing angle of a camera may be described by a viewing vector that extends at a ninety degree angle from a plane that describes a viewport associated with the camera. As such, the camera position and viewing angle describes the position and orientation of the viewport selected for the user by a content creator. The viewing vector may be described as a camera rotation in quaternion representation. For example, the camera rotation may specify an X component for a rotation of the camera using quaternion representation, a Y component for the rotation of the camera using quaternion representation, and a Z component for the rotation of the camera using quaternion representation. The camera rotation also includes a W component that can be calculated from the X, Y, and Z components. For example, the W component can be calculated according to qW=Sqrt (1−qX2+qY2+qZ2)), where qW, qX, qY, and qZ represents the W component, the X component, the Y component, and the Z component, respectively, and where Sqrt is a square root function.

In a specific implementation, the qX, qY, and qZ components of the camera rotation can be included in an acp_rotation_qx 935, an acp_rotation_qy 937, and an acp_rotation_qz 939, respectively, in an ACP syntax structure in an atlas APS 921. The qW may not be coded and may instead by calculated at the decoder based on the qX, qY, and qZ components as described above. The decoder can obtain the qX, qY, and qZ components from the V-PCC bitstream and calculate the qW component based on the qX, qY, and qZ components. The decoder can then generate the rotation matrix at step 1207 based on the qW, qX, qY, and qZ components. In an example, the rotation matrix comprises four rows and four columns and may contain various combinations of the qW, qX, qY, and qZ components as follows:

$$\begin{bmatrix} 1-2*(qY^2+qZ^2) & 2*(qX*qY-qZ*qW) & 2*(qX*qZ+qY*qW) & 0 \\ 2*(qX*qY+qZ*qW) & 1-2*(qX^2+qZ^2) & 2*(qY*qZ-qX*qW) & 0 \\ 2*(qX*qZ-qY*qW) & 2*(qY*qZ+qX*qW) & 1-2*(qX^2+qY^2) & 0 \\ 0 & 0 & 0 & 1 \end{bmatrix}$$

As such, the rotation matrix includes the X component, the Y component, the Z component, and a W component for the rotation of the camera using quaternion representation The decoder can then render a 2D view of the 3D point cloud using the viewport defined by the camera. At step 1209, the decoder can apply the offset matrix and rotation matrix to transform the points/data in the model matrix, for example via matrix multiplication. As such, the decoder renders the 2D view of the 3D point cloud by applying the offset matrix and the rotation matrix to the point cloud content. This approach transforms the data from a 3D coordinate system to a 2D coordinate system that can be displayed on a flat screen. As such, this approach results in a view of the 3D content from the perspective of a viewport defined by a content creator. The rendered point cloud content can then be forwarded to a display at step 1211. Hence, method 1200 increases functionality at both an encoder and decoder by creating predetermined and selectable viewing positions and angles for PCC video content. Further, method 1200 supports mechanisms to increase coding efficiency, for example by omitting qW from the V-PCC bitstream. Hence, method 1200 supports a reduction in processor, memory, and/or network resource usage at an encoder and/or a decoder.

Figure 13:
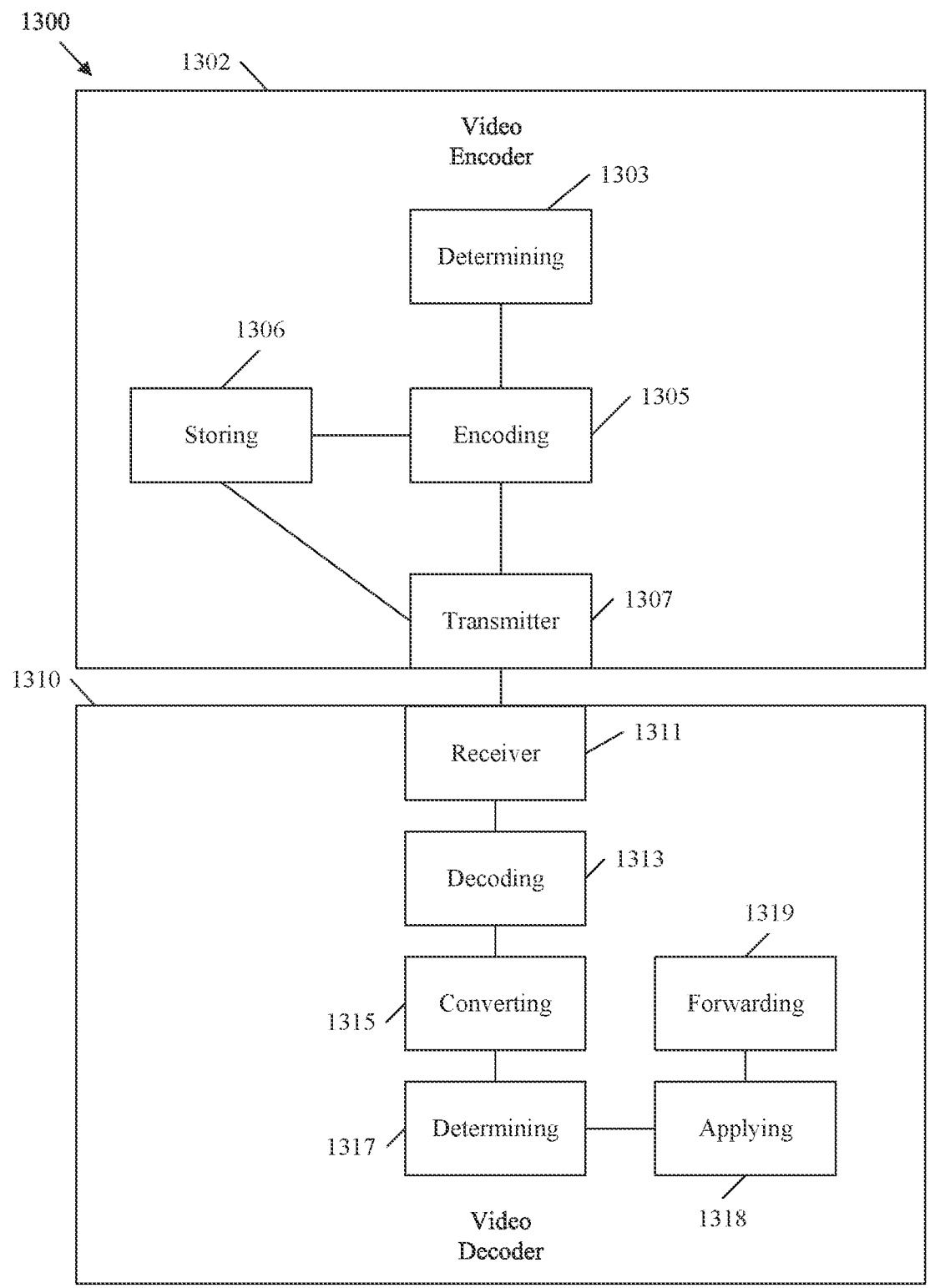
FIG. 13 is a schematic diagram of an example system for signaling camera parameters for rendering a point cloud.

FIG. 13 is a schematic diagram of an example system for signaling camera parameters, for example in a V-PCC bitstream 900, for rendering a point cloud for example according to mechanism 800. System 1300 may be implemented by an encoder and a decoder such as a codec system 200, an encoder 300, a decoder 400, and/or a video coding device 1000. As such, the system 1300 may operate on point cloud media 500, which is separated into a set of patches 603 and encoded into an occupancy frame 710, a geometry frame 720, an atlas frame 730 and/or an attribute frame. Further, system 1300 may be employed when implementing method 100, 1100, and/or 1200.

The system 1300 includes a video encoder 1302. The video encoder 1302 comprises a determining module 1303 for determining a camera offset describing a position of a camera relative to a point cloud frame to support generation of an offset matrix for rendering a camera view of the point cloud frame. The video encoder 1302 further comprises an encoding module 1305 for encoding a plurality of 2D patches and a geometry describing a point cloud frame into a PCC bitstream. The encoding module 1305 is further for encoding the camera offset into the PCC bitstream. The video encoder 1302 further comprises a storing module 1306 for storing the bitstream for communication toward a decoder. The video encoder 1302 further comprises a transmitting module 1307 for transmitting the bitstream toward a video decoder 1310. The video encoder 1302 may be further configured to perform any of the steps of method 1100.

The system 1300 also includes a video decoder 1310. The video decoder 1310 comprises a receiving module 1311 for receiving a bitstream comprising a plurality of 2D patches in an atlas frame and a camera offset for a camera. The video decoder 1310 further comprises a decoding module 1313 for decoding the patches. The video decoder 1310 further comprises a converting module 1315 for converting the patches to a 3D patch coordinate system via projection in a 3D bounding box to obtain a point cloud frame. The video decoder 1310 further comprises a determining module 1317 for determining an offset matrix based on the camera offset. The video decoder 1310 further comprises an applying module 1318 for applying the offset matrix to the point cloud frame. The video decoder 1310 further comprises a forwarding module 1319 for forwarding the point cloud frame for display. The video decoder 1310 may be further configured to perform any of the steps of method 1200.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by a decoder, the method comprising:
   receiving a bitstream comprising a plurality of patches in an atlas frame and a camera offset for a camera;
   decoding the patches in the atlas frame;
   converting the patches to a three dimensional (3D) patch coordinate system to obtain point cloud content;
   determining an offset matrix based on the camera offset, wherein the camera offset indicates a first offset corresponding to an X axis, a second offset corresponding to a Y axis, and a third offset corresponding to a Z axis, wherein the offset matrix comprises four rows and four columns, wherein the first offset is positioned at row one column four, wherein the second offset is positioned at row two column four, and wherein the third offset is positioned at row three column four; and applying the offset matrix to the point cloud content.

2. The method of claim 1, wherein the bitstream further comprises a camera rotation for the camera, and wherein the method further comprises:

determining a rotation matrix based on the camera rotation; and applying the rotation matrix to the point cloud content.

3. The method of claim 2, wherein the camera rotation specifies an X component for a rotation of the camera using quaternion representation, a Y component for the rotation of the camera using quaternion representation, and a Z component for the rotation of the camera using quaternion representation.

4. The method of claim 3, wherein the rotation matrix includes the X component, the Y component, the Z component, and a W component for the rotation of the camera using quaternion representation.

5. The method of claim 4, wherein the W component is calculated according to: $qW=Sqrt(1-qX^2+qY^2+qZ^2))$, where qW, qX, qY, and qZ represents the W component, the X component, the Y component, and the Z component, respectively, and where Sqrt is a square root function.

6. The method of claim 1, wherein the patches in the atlas frame are two dimensional (2D) patches.

7. A method implemented by an encoder, the method comprising:

encoding a plurality of two dimensional (2D) patches and a geometry describing a point cloud frame into a bitstream;

determining a camera offset describing a position of a camera relative to the point cloud frame to support generation of an offset matrix for rendering a camera view of the point cloud frame;

encoding the camera offset into the bitstream, wherein the camera offset indicates a first offset corresponding to an X axis, a second offset corresponding to a Y axis, and a third offset corresponding to a Z axis, wherein the offset matrix comprises four rows and four columns, wherein the first offset is positioned at row one column four, wherein the second offset is positioned at row two column four, and wherein the third offset is positioned at row three column four; and storing the bitstream for communication toward a decoder.

8. The method of claim 7, further comprising:

determining a camera rotation describing a viewing vector for the camera relative to the point cloud frame to support generation of a rotation matrix for rendering the camera view of the point cloud frame; and encoding the camera rotation into the bitstream.

9. The method of claim 8, wherein the camera rotation specifies an X component for a rotation of the camera using quaternion representation, a Y component for the rotation of the camera using quaternion representation, and a Z component for the rotation of the camera using quaternion representation.

10. The method of claim 9, wherein the rotation matrix includes the X component, the Y component, the Z component, and a W component for the rotation of the camera using quaternion representation.

11. The method of claim 10, wherein the W component is calculated according to: $qW=Sqrt(1-qX^2+qY^2+qZ^2))$, where qW, qX, qY, and qZ represents the W component, the X component, the Y component, and the Z component, respectively, and where Sqrt is a square root function.

12. A video coding device comprising:

a receiver configured to obtain a bitstream comprising a plurality of patches in an atlas frame and a camera offset for a camera; and a processor configured to:

decode the patches in the atlas frame;

convert the patches to a three dimensional (3D) patch coordinate system to obtain point cloud content;

determine an offset matrix based on the camera offset, wherein the camera offset indicates a first offset corresponding to an X axis, a second offset corresponding to a Y axis, and a third offset corresponding to a Z axis, wherein the offset matrix comprises four rows and four columns, wherein the first offset is positioned at row one column four, wherein the second offset is positioned at row two column four, and wherein the third offset is positioned at row three column four; and apply the offset matrix to the point cloud content.

13. The video coding device of claim 12, wherein the bitstream further comprises a camera rotation for the camera, and wherein the processor is further configured to:

determine a rotation matrix based on the camera rotation; and apply the rotation matrix to the point cloud content.

14. The video coding device of claim 13, wherein the camera rotation specifies an X component for a rotation of the camera using quaternion representation, a Y component for the rotation of the camera using quaternion representation, and a Z component for the rotation of the camera using quaternion representation.

* * * * *

UNITED STATES PATENT AND TRADEMARK OFFICE
CERTIFICATE OF CORRECTION

| | | |
|---|---|---|
| PATENT NO. | : 12,118,757 B2 | Page 1 of 1 |
| APPLICATION NO. | : 17/857894 | |
| DATED | : October 15, 2024 | |
| INVENTOR(S) | : Jeffrey Moguillansky et al. | |

It is certified that error appears in the above-identified patent and that said Letters Patent is hereby corrected as shown below:

On the Title Page

Item (71) Applicant: Delete "Huawei Technologies Co., Ltd., Guangdong (CN)" and insert -- Huawei Technologies Co., Ltd., Shenzhen (CN) --.

Signed and Sealed this
Tenth Day of December, 2024

Katherine Kelly Vidal
*Director of the United States Patent and Trademark Office*